United States Patent [19]

Chin et al.

[11] Patent Number: 5,497,465
[45] Date of Patent: Mar. 5, 1996

[54] PARALLEL DIGITAL PROCESSING SYSTEM USING OPTICAL INTERCONNECTION BETWEEN CONTROL SECTIONS AND DATA PROCESSING SECTIONS

[75] Inventors: Danny Chin, Robbinsville; Donald J. Sauer, Allentown; Dietrich Meyerhofer, Princeton, all of N.J.; Kazuo Katsuki, Hyogo, Japan

[73] Assignee: Nippon Sheet Glass Co., Ltd., Osaka, Japan

[21] Appl. No.: 368,242

[22] Filed: Jan. 3, 1995

Related U.S. Application Data

[63] Continuation of Ser. No. 857,626, Mar. 25, 1992, abandoned.

[51] Int. Cl.$^6$ .................................................... G06F 13/00
[52] U.S. Cl. .................... 395/280; 395/200.01; 359/109; 359/128; 364/229; 364/229.2; 364/240.1; 364/240.6
[58] Field of Search ................................ 395/800, 325, 395/200, 280, 200.01; 359/128, 109; 385/16, 17, 31

[56] References Cited

U.S. PATENT DOCUMENTS

| | | | |
|---|---|---|---|
| 4,225,213 | 9/1980 | McBride, Jr. et al. | 385/89 |
| 4,400,768 | 8/1983 | Tomlinson | 395/800 |
| 4,769,771 | 9/1988 | Lippmann et al. | 395/200 |
| 4,838,630 | 6/1989 | Jannson et al. | |

(List continued on next page.)

FOREIGN PATENT DOCUMENTS

| | | |
|---|---|---|
| 3911543 | 8/1990 | Germany. |
| 55-151377 | 11/1980 | Japan. |
| 56-79468 | 6/1981 | Japan. |
| 56-91482 | 7/1981 | Japan. |
| 62-52961 | 3/1987 | Japan. |
| 2-16768 | 1/1990 | Japan. |

OTHER PUBLICATIONS

T. Sakano et al.; "Design & Performance of a Multi-Processor System Employing Board-to-Board Free-Space Optical Connections: Cosino-1"; Applied Optics, vol. 30, No. 17; Jun. 10, 1991; pp. 2334–2343.

K. Brenner et al.; "Digital Optical Computing with Symbolic Substitution"; Applied Optics vol. 25, No. 18; Sep. 15, 1986, pp. 3054–3060.

G. Stucke "Parallel Architecture for a Digital Optical Computer"; Applied Optics; vol. 28, No. 2, Jan. 15, 1989; pp. 363–370.

B. K. Jenkins et al. "Sequential Optical Logic Implementation"; Applied Optics; vol. 23, No. 19, Oct. 1, 1984; pp. 3455–3464.

Y. Ichioka et al.; "Optical Parallel Logic Gates Using a Shadow Casting System for Optical Digital Computing" Proceedings of the IEEE vol. 72, No. 7; Jul. 1984; pp. 787–801.

A. Huang "Architectural Considerations Involved in the Design of an Optical Digital Computer"; Proceedings of the IEEE vol. 72 No. 7, Jul. 1984, pp. 780–786.

(List continued on next page.)

*Primary Examiner*—Krisna Lim
*Attorney, Agent, or Firm*—Ratner & Prestia

[57] ABSTRACT

MIMD and pipeline processing is executed by entering data and control signals into processing chips in the form of optical signals, and entering multi-bit information (data and control signals) in parallel and at high speed on the basis of non-coherence of light beams. The efficiency of MIMD processing function has been improved by expanding data transfer buses between processors and output buses in place of data and control signal input buses that have become unnecessary. A processing chip for receiving optical signals consists of a large number of cells dedicated for vector computations, and/or a large number of cells dedicated for vector computations and/or cells dedicated for arithmetic and logical computations. A processing chip for wide applications ranging from vector computations to logical computations by employing a construction combining both processors.

13 Claims, 27 Drawing Sheets

U.S. PATENT DOCUMENTS

| | | |
|---|---|---|
| 4,859,012 | 8/1989 | Cohn .................................... 350/96.24 |
| 4,862,231 | 8/1989 | Aband ..................................... 257/81 |
| 4,881,164 | 11/1989 | Hailperm et al. ....................... 395/200 |
| 4,937,777 | 6/1990 | Flood et al. ............................ 395/325 |
| 4,947,478 | 8/1990 | Maeno .................................... 395/325 |
| 4,966,447 | 10/1990 | Huang et al. . |
| 4,989,131 | 1/1991 | Stone ..................................... 395/375 |
| 5,014,189 | 5/1991 | Tamitani ................................ 395/800 |
| 5,037,173 | 8/1991 | Sampsell et al. ......................... 385/17 |
| 5,056,000 | 10/1991 | Chang .................................... 395/325 |
| 5,093,879 | 3/1992 | Bregman et al. ......................... 385/93 |
| 5,148,547 | 9/1992 | Kahle et al. ............................ 395/800 |
| 5,165,104 | 11/1992 | Weverka .................................... 385/7 |
| 5,175,865 | 12/1992 | Hillis ..................................... 395/800 |
| 5,185,866 | 2/1993 | Francisco ............................... 395/325 |

OTHER PUBLICATIONS

J. L. Hennessy et al. "Computer Technology & Architecture; An Evolving Interaction" Computer Vol. 24, No. 9, Sep. 1991; pp. 18–29.

A. Y. Cho et al. "Photonic Materials & Processing" AT&T Technical Journal; vol. 69, No. 6, Nov./Dec. 1990, pp. 77–91.

G. E. Blonder et al, "Interconnection Processes & Materials" AT&T Technical Journal, vol. 69, No. 6, Nov./Dec. 1990; pp. 46–59.

L. T. Manzione et al. "Polymers in Electronics Packaging" AT&T Technical Journal vol. 69, No. 6, Nov./Dec. 1990 pp. 60–76.

Guha Aloke et al; "Optical Interconnections for massively Parallel Architectures"; Applied Optics, vol. 29 No. 8, pp. 1077–1093.

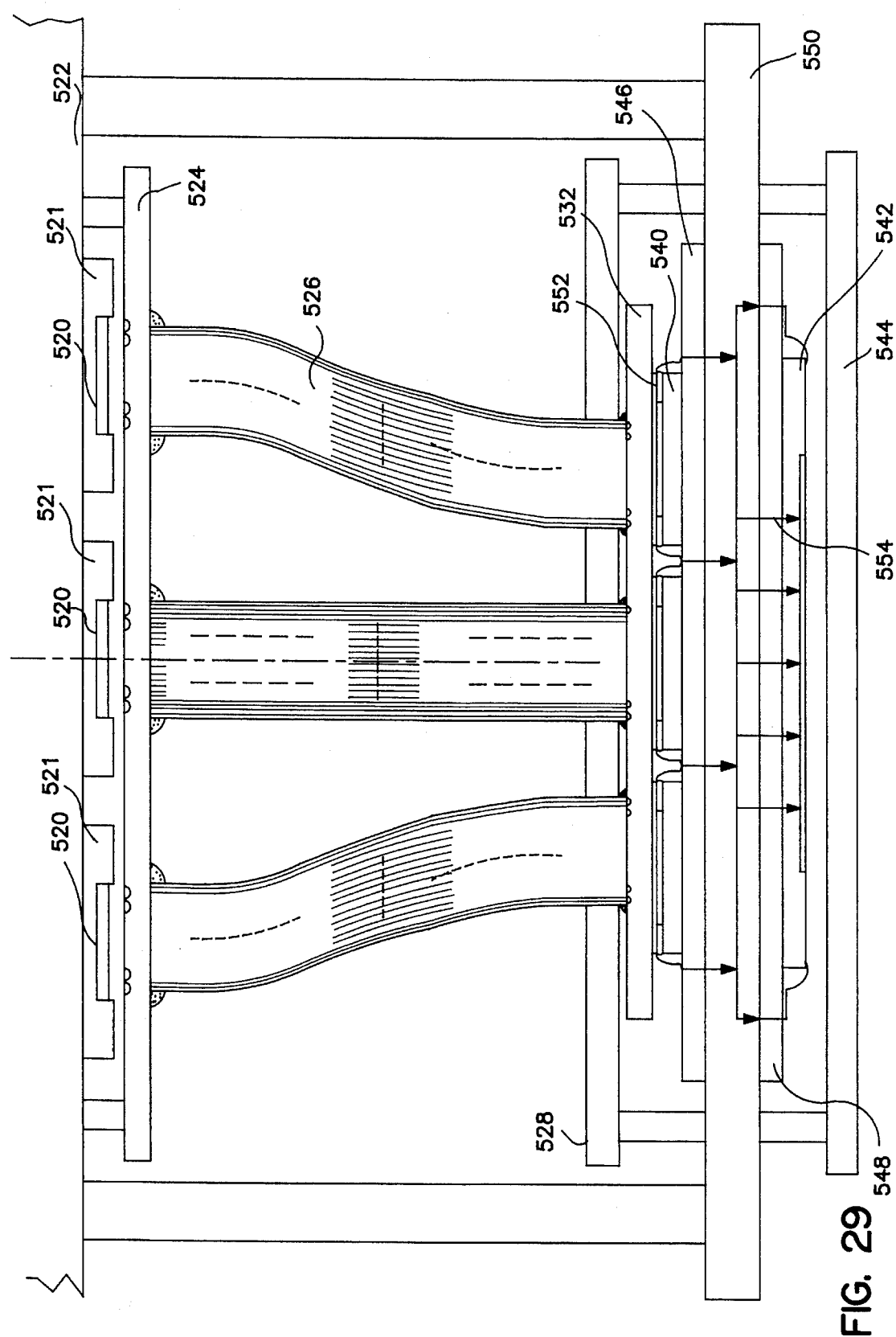

PARALLEL DIGITAL PROCESSING SYSTEM USING OPTICAL INTERCONNECTION BETWEEN CONTROL SECTIONS AND DATA PROCESSING SECTIONS

This application a continuation of application Ser. No. 07/857,626 filed Mar. 25, 1992 now abandoned.

BACKGROUND OF THE INVENTION

1. Field of the Invention

This invention relates generally to a parallel computer system, and more particularly to a parallel computer system using optical signal transfer procedure. Furthermore, this invention also relates to an optical interconnection block, processing block, system control block comprising a parallel computer system.

2. Description of the Prior Art

A supercomputer is a computer that performs vector and scalar computations at high speed. The supercomputer is usually supported by sophisticated software to execute these operations. On the other end of the scale, processors performing numerical operations at high speed, such as DSPs (Digital Signal Processors), and RISC (Reduced Instruction Set Computer) processors. DSPs are often used as digital signal processors, while RISC processors are generally used as processors for work stations. Both processors have essentially the same architecture in which high-speed operations are accomplished by separating the supply of data from that of instructions, and reducing the number of clock cycles required to execute operations. In order to reduce the time for decoding instructions, operations are performed with a small number of simplified instructions. This leads to reductions in the number of circuits and devices needed for higher-speed operations, permitting the space previously occupied by the circuits and devices to be used for cache memories and other devices. This contributes much to higher-speed operations. In both cases, operations are performed with a pipeline architecture. Some computers consist primarily of a single processing section having a multiplier unit (MU), and an arithmetic and logic unit (ALU), while some computers have a small number of parallel processing blocks. In both cases, a single-chip architecture is employed, in which a processing section, control section and a small number of memories are mounted on a single chip.

A parallel computer having multiple processing sections and performing parallel operations uses those RISC or CISC (Complex Instruction Set Computer) processors inter-connected by a special network (for example, multiple RISC transpurer processors with an N-cube connecting network). In a parallel computer, control of multiple processors is performed by one or more control units. In such a computer, operations are mostly performed in a SIMD (Single Instruction Multiple Data) mode where all processors perform the same operations with one common instruction. Some computers consisting of networks of this type accomplish high-speed operations by using several hundred thousands of simple processors, rather than using sophisticated processors, such as RISC. This type of computer, however, has failed to grow into general-purpose computers. The image processor is an example of such computers having essentially the same architecture and specific functions for image processing. Its simplest form is the image processing machine consisting of a 1-bit processor element. Aside from this type, most machines dedicated for image processing employ an architecture which performs special product-sum operations at high speed, for image processing such as spatial filtering.

Various architectures are adopted for the aforementioned computers according to the application fields thereof. The common characteristic of these architectures is the ability to execute high-speed processing in order to achieve a high cost-performance ratio. In current practice, a parallel processor architecture is adopted and a parallel and/or a pipeline operation are/is executed so as to carry out high-speed processing. This processor architecture is typically called superpipeline or superscaler. However, there are many problems to be solved in such computer system architectures, which have been discussed in many publications, for example in AT&T Technical Journal, Vol. 69 No. 6, Nov./Dec. 1990 and in IEEE Computer, Vol. 24, No. 9, pp. 18, 1991.

One such problem is clock skew. Clock cycles become inevitably shorter and shorter as higher-speed processing is pursuited. As a result, mismatch of synchronizing signals among gates may occur because synchronizing signals are passed through circuits having different length. These mismatches are not only caused in connections between processors comprising a parallel computer, but also within an arithmetic logic unit used in the processor to execute superpipeline or superscaler operations. Another problem occurs when data and instruction transfer buses include a plurality of electric conductive lines. When a plurality of processors are operated in parallel, these buses between processors are desirably operated in parallel to increase the effective band width of the data transfer channel. This results in complex bus configurations and interference of signals among lines in the buses. In the case of a circuit in a chip, the area occupied by lines of buses becomes larger and the processing area becomes smaller. Circuit and wiring technology is big problem to be overcome in current computer technology.

To overcome the aforementioned difficult problems in a current digital computer, intense research of optical computers is being carried out. An overview in this field may be found in Proc. IEEE, Vol. 72, No. 7, pp. 780, 1984. Typical architectures used are "Shadow Casting" described in Proc. IEEE Vol 72 pp. 787, 1984, "Symbolic Substitution" in Appl. Opt. Vol. 25, No. 18, pp. 3054, 1986 and "Logic Processing by Spatial Light Modulator" in Appl. Opt. Vol. 23, No. 19, pp. 3455, 1984 which are hereby incorporated by reference for their teachings on optical signal processing. Another approach to optical processing is a combined architecture of optics and digital processors, some of which are disclosed as a digital optical computer in Appl. Opt. Vol. 28, pp. 363, 1989. Concepts of the optical computer are very interesting, but it is not clear at this time whether these computers overcome the aforementioned difficult problems brought forward by electronic computers. Problems of clock skew, of complex wiring and of wide band width communication buses may be avoided with respect to arithmetic and logical processing parts in the optical computer. However, peripheral components of the optical computer supporting to these processing parts may cause same difficulties as one of the electronic computer. It is necessary to investigate its performance as total computer system.

A hybrid approach which uses optical fiber interconnection between electronic boards is described in Appl. Opt. Vol. 30, No. 7, pp. 2334, 1991. This approach makes use of transputers as parallel processors. Its optical interconnection along a back plane may be reconfigured. Electronic signals converted from optical signals at peripheral parts of boards are transferred to the transputers through electric links on boards like those found in a conventional computer. Therefore, the architecture of optical interconnection fails to escape from difficult problem caused by too many connector pins of a chip to circuits on the board.

As computers make more and more use of VLSI technology, requiring higher communications densities, optical interconnection become more and more important. Various concepts of optical interconnection have been proposed and tested. Typical ones are beam shuffle networks, crossover networks and free space interconnections. The free space interconnection has two main applications. The first is to selectively connect traveling beams in space to receiver components or devices by making use of hologram devices. This technique is disclosed in U.S. Pat. No. 4,135,706 issued on Dec. 21, 1987. The second application is to selectively connect devices by beams traveling in a dielectric layer, being reflected many times from both surfaces of the dielectric substrate plane to and being focused by hologram lenses to reach the appropriate devices. This procedure allows accurate positioning of light emitting and receiving devices by use of the well known fabrication technology for semiconductor chips, which is disclosed in U.S. Pat. No. 4,966,447 issued on Oct. 30, 1990. These free space interconnection methods are suitable for a computer system which is accommodated in a small housing compared with other methods. Due to the coherent nature of the laser beam and the hologram technology, selective interconnections can be achieved and dispersion of traveling beam in a dielectric substrate prevented. The final application targets mainly interconnection between boards while the latter procedure targets interconnection between semiconductor devices. In order to carry out the latter interconnection scheme, many supporting chips, laser arrays, drivers for laser arrays, sensor arrays and circuits or buses which send and receive al the signals necessary for electrically driving processing chips, should be mounted on a dielectric substrate. This is really equivalent to an interconnection between boards. A transparent glass substrate which is described as the best substrate in U.S. Pat. No. 4,966,447 may cause other problems when high frequency electric signals are transmitted between two chips.

In many of the aforementioned processors, data and control signals are transferred as electrical signals, and their inputs and outputs are controlled in accordance with instructions generated by the control section. Expansion of band width for input/output to improve operation speed and accuracy of arithmetic calculations is indispensable for higher-speed computing. It would lead to an increase in the number of input/output signals to the chip. With increases in band width, an increased number of input/output pins are needed on the board on which the chip is mounted. The number of pins that can be mounted on one chip, however, is limited to less than 500 with the current technological level.

Increasing the quantity of input/output signals to the chip would also inevitably result in complicated wirings on the circuit board. In high-speed operations involving high clock frequency, disturbances in signals or signal delays caused by wirings may cause operational errors, and limit the operational speed of the system.

Furthermore, the conventional processors are not capable of performing vector and scalar operations at high speed on a single chip. Although there exist supercomputers performing vector and scalar operations at high speed, they usually rely on separate chips. Processors of a DSP or RISC level have no appropriate architecture for performing vector and scalar operations at high speed.

SUMMARY OF THE INVENTION

It is an object of this invention to provide a computer system for performing multi-instruction multi-data flow (MIMD) operations at high speed with a parallel pipeline architecture by eliminating the obstacles to high-speed digital operations inherent in the conventional full-electronic system.

It is another object of this invention to provide a computer system that allows the modes best suited to the data processing to be selected, thereby contributing to high-speed processing, by inputting independently and in parallel multiple control signals and data required for MIMD operations to multiple processing cells.

It is still another object of this invention to provide a computer system that can perform at high speed data transfer between independent processor cells needed for MIMD operations.

It is still another object of this invention to provide a computer system having an optical interconnection system that allows multiple signals required for operations to be simultaneously entered into processing chips.

It is a further object of this invention to provide an optical interconnection block that implements optical signal transfers.

It is still a further object of this invention to provide a processing block constituting a computer system.

It is still a further object of this invention to provide a system control block constituting a computer system.

To accomplish these objects, the computer system of this invention makes it possible to rely on the non-coherence of light beams to enter multiple required signals in the form of optical signals in parallel and at high speed from spatially separated light-emitting array chips into processing chips, thereby simultaneously entering multiple signals required for operations. In this way, by optically entering multiple data and control signals, multiple processing cells perform MIMD parallel pipeline operations. Furthermore, high-speed vector-matrix processing is carried out by arranging processing cells, such as MU (Multiplier Unit) type cells dedicated for product-sum operations and ALU (Arithmetic and Logic Unit) type cells for arithmetic and logical operations, into appropriate combinations and configurations in accordance with specific operation purposes.

BRIEF DESCRIPTION OF THE DRAWINGS

FIG. 29 is a diagram illustrating an optical interconnection block using fiber bundles with sensors and LED arrays interposed.

DESCRIPTION OF THE EXEMPLARY EMBODIMENTS

Figure 1:
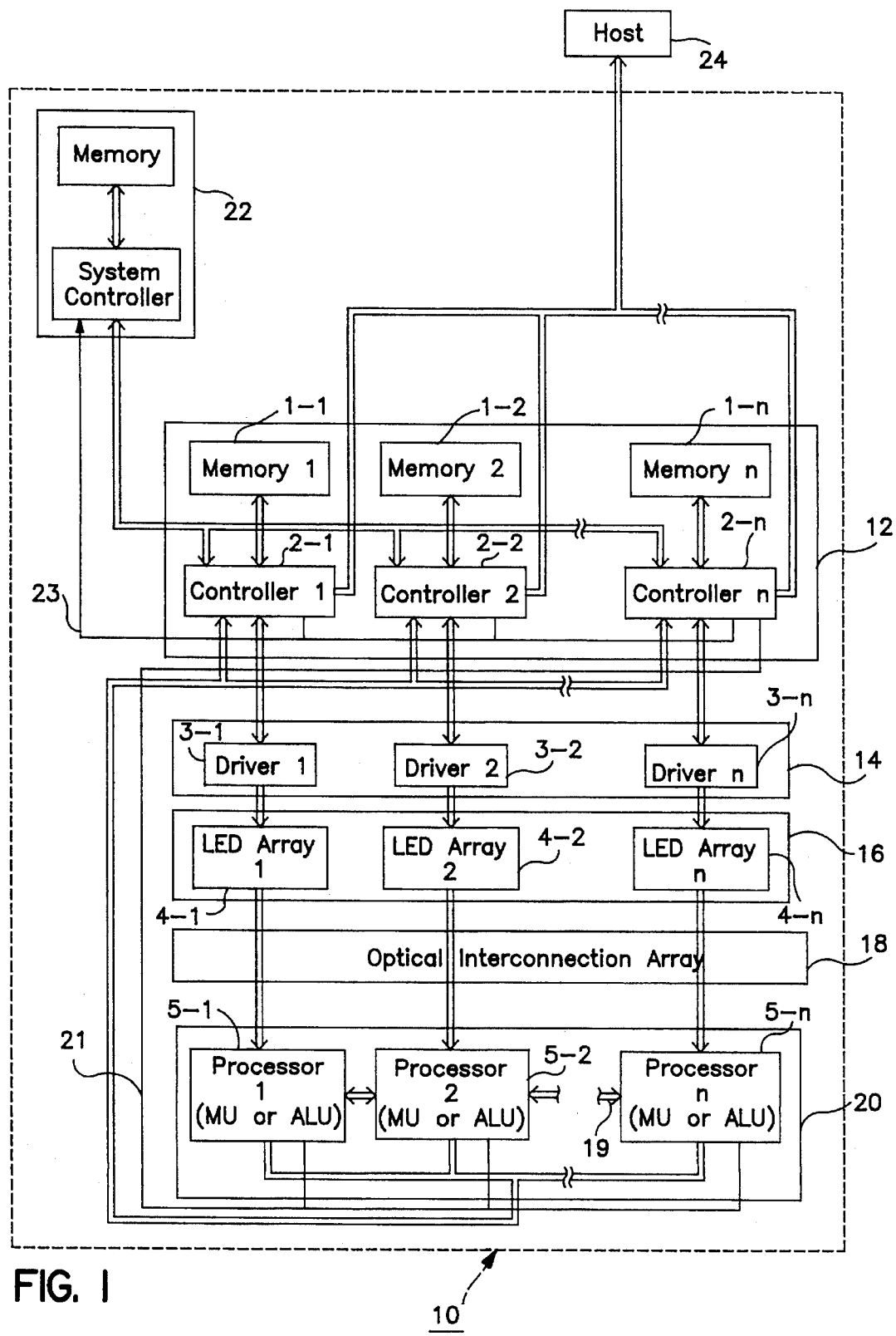
FIG. 1 is a diagram illustrating the overall configuration of a parallel computer processing system according to this invention.

FIG. 1 illustrates the overall configuration of a computer system according to this invention. The area enclosed by dotted lines in the figure is a computer system 10 using optical input. The computer system 10 comprises a control section 12 consisting of n memory elements 1-1, 1-2, . . . , 1-n each having an instruction memory and a data memory, and n controllers 2-1, 2-2, . . . , 2-n; a driver section 14 consisting of n LED drivers 3-1, 3-2, . . . , 3-n; an LED array section 16 consisting of n LED arrays 4-1, 4-2, . . . , 4-n; a processing section 20 consisting of n processors 5-1, 5-2, . . . , 5-n each having an optical input section that is capable of photoelectric conversion; an optical interconnection section 18 optically interconnecting the LED array section 16 and the processing section 20; a system control section 22 controlling the controllers of the control section 12.

The optical interconnection section 18 is one of the key components of this invention that transfers a large amount of information in parallel with optical digital signals from the control section 12 to the processing section 20.

The basic function of each processor of the processing section 20 is to perform processing independently using their specific programs. Data transfer among the processors is carried out by controlling IPC buses (inter-processor connecting buses) 19 incorporating in the processing section 20 and output buses as necessary.

A system control section 22 causes controllers of the control section 12 controlling MIMD processing to function more effectively by use of sync-signals. The system control section 22 prevents the overall operation efficiency from deteriorating by processing the programs and data of those processors which tend to lower the overall operation efficiency among the controllers in the control section 12, and reallocating their throughput.

The program decoded and compiled by the host computer 24 is stored in n instruction memory elements via n controllers. Data are also stored in n data memories. The data memories are flexibly constructed using only high-speed memories or using both high-speed and low-speed memories as necessary. Although controllers read data from their respective high-speed memories, when high-speed and low-speed memories are used in combination, data transfer to and from both types of memories is accomplished by the DMA (direct memory access) section of the controller.

Operations are executed in the following manner; an instruction code for a micro-program is read from an instruction memory belonging to each controller in accordance with an instruction given by the program counter, and data are read from a data memory in accordance with the contents of the code, and decoded for output to the output gate. These procedures are similar to those performed in ordinary processing units.

Part of multiple output wirings of each controller serve as control wires for controlling the light emission of LED elements in an LED array. The information output by a controller consists of control and data signals for a processor, which are transferred to the processor as optical digital signals identified by the emission or non-emission of light by multiple LED elements in the LED array. LED array chips need not correspond with individual LED drivers. Multiple elements in a single LED array chip may be controlled by the outputs of a plurality of LED drivers. The entire quantity of control and data signals required for processors is so large that a plurality of LED array chips are employed if it is difficult for a single LED array chip to transfer all the signals.

Processors are arranged into arrays on processor chips, which are fewer in number than LED array chips. Each processor receives control and data signals needed to execute operations, which are subject to photoelectric conversion in parallel in an optical input section. The digital signals converted into electrical signals are latched and amplified, and execute operations in synchronism with the clock of the processor. Since a large number of processors are mounted on a single processor chip, a large quantity of control and data signals are used to implement parallel processing. It is difficult to provide such a large quantity of electrical input connectors on a chip. Connections by propagating optical signals according to this invention successfully-solves this difficulty.

As a result of substituting optical signal inputs for control and data inputs, the need for signal wires around processors is considerably reduced, and IPC buses 19 for transferring data between processors are expanded. Thus, data transfer is carried out at high speed, contributing greatly to efficient MIMD operations.

Optical interconnection permits the same digital signals to be transferred to multiple processors. It is therefore suitable for the duplicated inputting of the same data, as in the execution of matrix-vector operations. Where product-sum operations are mainly executed, operation performance can be improved by combining (MU type) processors dedicated for product-sum operations without imparting a logical judgement function to processors and (ALU type) processors for arithmetic and logical operations in the array.

Data transfer between processors and the use of data in internal memories are controlled by optical-input control signals, but the outputting of data from a processor can also be controlled by electrical control signals from the controllers of the control section 12. Mutual adjustment of n processors executing operations in the MIMD mode is carried out by a sync-signal 23 from the system control section 22. The sync-signal executes operations by continuously generating "0" signals so long as any one processor executes operations independently of other processors. At the moment when that processor has come into some relations in terms of program execution with other processors, the sync-signal generates a "1" signal to stop operations, and keeps generating the "1" signals thereafter. When all the processors are brought into the state of sync-signals=1, data transfer among processors are executed and the sync-signals are reset to restart all of the processors. The system control section 22 has such a function that, regardless of the waiting state of other processors, a processor keeps executing a large operation loop to cause the overall efficiency to lowering. In other words, when only one processor executes operations, the system control section 22 identifies that processor and executes a higher-order control of reallocating its processing among other processors.

Although both data and control signals are entered optically in the above-mentioned configuration, control signals may be entered as electrical signals into the processing section 20, instead of optical input. As described above, the output control of an output register in the processor is preferably performed with control signals 21 directly provided by a controller of the control section 12.

Next, each component of the computer system 10 will be described specifically. Two typical examples of computer system specifications are given in Table 1.

TABLE 1

| | Example 1 | Example 2 |
|---|---|---|
| Processing section (processor array) | 256 cells (16×16) of which; 32 cells are for arithmetic and logical operations, and the remaining are for product-sum operations. | 64 cells (16×16) all of which are for arithmetic and logical operations. |
| Input data Channels Word length (bit width) × no. of words | Optical-input system 64  16×1 | Optical-input system 64  16×2 |
| Output data Channels Word length (bit width) × no . of words | Pin connector system 32  8×1 | Pin connector system 8  20×1 |
| Control signal (Instruction) Channel × bit width | Pin connector system 4×8 | Optical-input system 64×32 |
| Control signal (output) Channel × bit width | Pin connector system 4×8 | Pin connector system 1×3 |
| Clock rate | 25 MHz | 25 MHz |
| Total number of inputs/outputs | 1344 | 4259 |

If all input/output operations to processing chips in the processing section are performed electrically in the computer system of the Example-1 specifications, the number of pins on the processing chips runs to as many as 1344, far exceeding the allowable limit of pins on a chip. Optical entry of at least the data signals, however, may reduce the required number of pins on the processing chip to 352, including 32 pins of power signals, a level that can be easily achieved with the current technology. Although the number of signal input pins on an LED array chip board for optical input amounts to 1,024, simple input/output wirings for electrical signals can be accomplished relatively easily since the size of the LED array chip may be made larger, compared with the processing chip.

Figure 2:
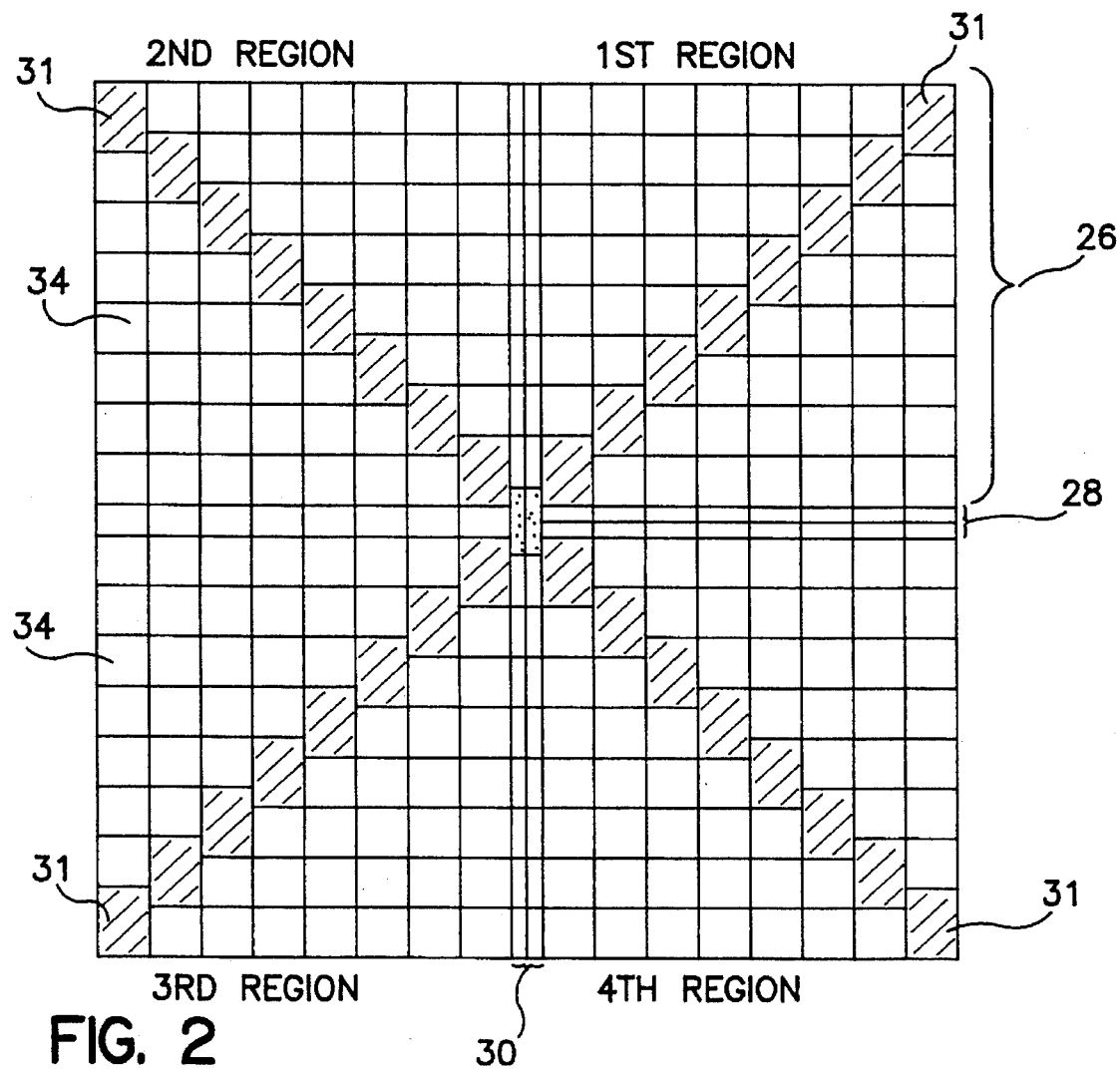
FIG. 2 is a diagram illustrating a typical construction of a processing chip in which only data are entered optically.

Example 2 represents a processing system of a more versatile construction all cells of which are arithmetic and logical operation cells (ALU type), in which MIMD-mode operations can be executed. In the system, 32 bits of control signals and 32 bits (2 words) of data signals are entered in parallel into 64 processor cells. When input/output operations are performed electrically, the number of input/output pins on 64 processor cells, which are mounted on a single chip, amounts to more than 4,259, a level that is hard to realize with the current technology. LED chips need not be integrated into a single chip, but they may be divided into a plurality of chips having the allowable limit of pins, i.e., LED elements, if optical entry of signals to the processor chips is used. FIG. 2 shows a typical construction of the processing chip of Example 1 in which only data are input optically. This processing chip consists of a processing cell array 26 having 256 (16×16) processing cells, an X-data optical-input cell array 28 disposed crisscross in the middle of the chip, and a Y-data optical-input cell array 30. Among the processing cell array 26, the 32 processing cells 31 disposed on the diagonal are ALU processors for executing 16 types of logical operations, while the processing cell 34 disposed on outside the diagonal are MU processors dedicated for product-sum operations. Although the ALU processor 31 which has a more complex construction than the MU processor 34 extends in the column direction because of its large size, it may also extend in the row direction. The data optical-input cell arrays 28 and 30 receive the data needed for operations in the form of optical signals of 16 bits/cell to transfer to the processing cells.

The processing chip consists of (1st to 4th) four regions each of 8×8 cells divided with the data optical-input cell arrays 28 and 30. Each region may be of the same construction, or of different constructions. In the exemplary embodiment of the invention, it has a construction in which 4 processor arrays are integrated on a single chip, each processor array performing 64 identical instructions. With this construction, processor arrays in each region may perform separate operations.

The data optical-input cell arrays 28 and 30 transfer data to processing cells in each region, as noted earlier. Each cell of the Y-data optical-input cell array 30 enters the same data, Y, to the processing cells in the same row in a region. Similarly, each cell of the X-data optical-input cell array 28 transfers data, X, to the processing cells in the same column in a region. Consequently, only the 36 ALU processors on the diagonal receive independent data X and Y, while the data received by the MU processor 34 disposed outside the diagonal are not independent. The input data X on a given column correspond with the input data $Y_{i,1}, Y_{i,2}, \ldots Y_{i,8}$ (i: region). This represents a construction suitable for matrix product-sum operations.

In the processing chip, data are entered optically, and control signals are electrically fed via input pins. In addition, output data and power lines are electrically wired via pins.

Figure 3A:
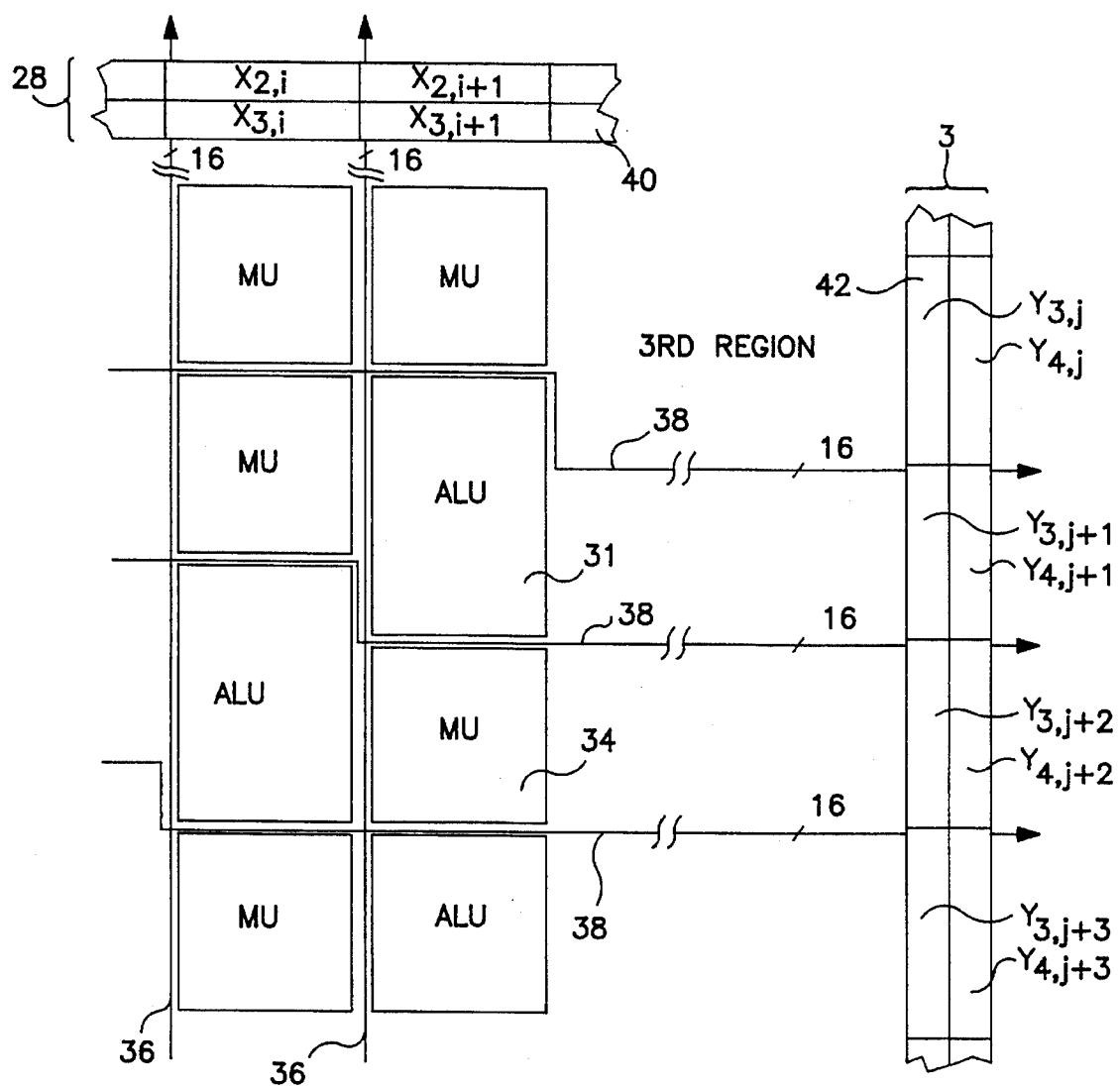
FIG. 3A is an enlarged view of part of the third region of FIG. 2

FIG. 3A is an enlarged view of part of the third region shown in FIG. 2. Each data optical-input cell of the data optical-input cell arrays 28 and 30 disposed crisscross in the middle of the processing chip is disposed in parallel with the data optical-input cell to the neighboring region. An X-data optical-input cell 40 and a Y-data optical-input cell 42 to the third region transfer data X and Y to the corresponding processing cell rows or columns in the third region via an X-data wire 36 and a Y-data wire 38 in a 16-bit data channel.

Figure 3B:
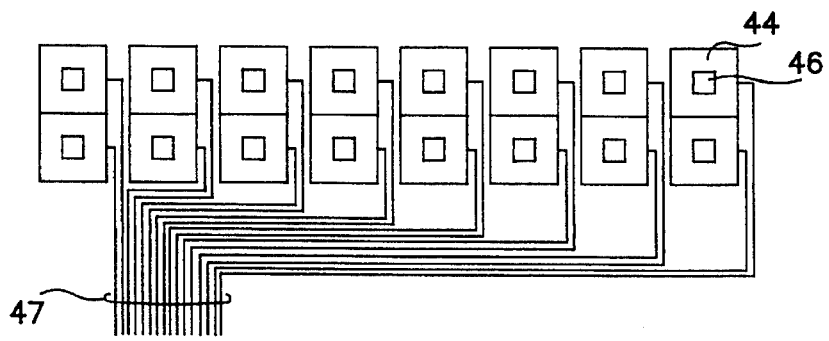
FIG. 3B is a diagram illustrating the construction of optical-input cells comprising an optical-input cell array.

FIG. 3B shows the construction of an optical-input cell constituting an optical-input cell array. This optical input cell consists of 16 cell elements 44 having external dimensions of approximately 100 μm×100 μm, each of which has a light-receiving sensor 46 in the middle thereof. Around the light-receiving sensor 46 provided are a circuit that converts required signals from received optical signals, that is, a circuit that responds in 250 photon numbers at a clock rate of 25 MHz, or more specifically a high-speed CMOS amplifier circuit having an automatic zero compensation circuit that sets the offset voltage of input signals to 1 mV, for example. Converted signals are transferred in parallel from the 16 cell elements 44 and reduced to 16-bit data signals 47.

Figure 4:
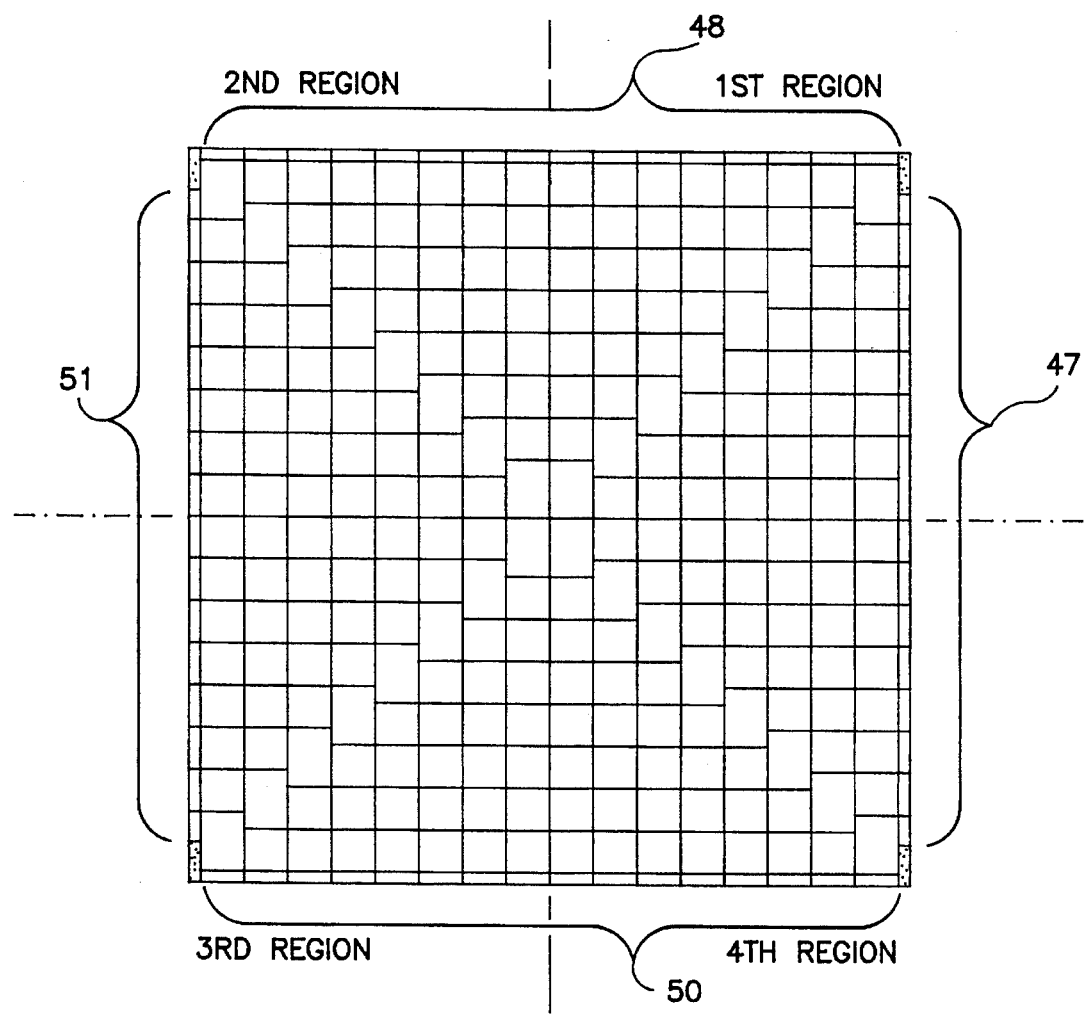
FIG. 4 is a diagram illustrating another typical construction of a processing chip.

FIG. 4 shows another typical construction of the processing chip of Example 1. Whereas the processing chip shown in FIG. 2 has data optical-input cell arrays in the middle thereof, the example shown in FIG. 4 has optical input cell arrays in the peripheral parts of the processing cell arrays. In this construction, optical-input cell arrays can be divided into four for each peripheral part by fabricating into 2×8×10 linear arrays 48, 49, 50 and 51 of the same shape, each fixed separately to each peripheral part.

Figure 5:
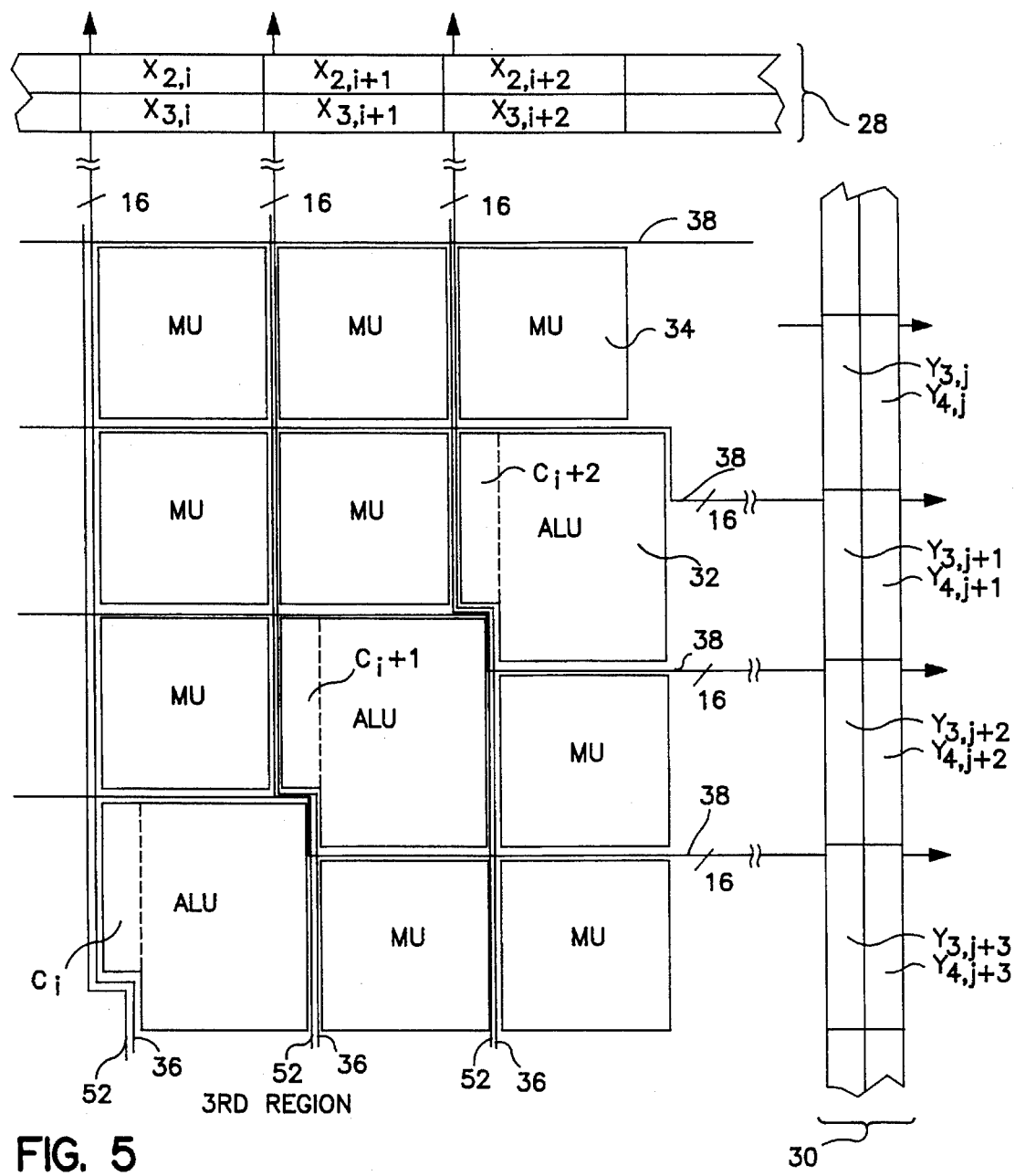
FIG. 5 is a diagram illustrating part of the third region of a processing cell array in which not only data signals but also control signals are entered optically.

FIG. 5 shows part of the third region of a processing cell array, which has such a construction that not only data signals but control signals are entered optically, on the processing chip of FIG. 2. An optical-input cell receiving control signals is disposed in each ALU processor 32. In the figure, control signal optical-input cell $C_i$, $C_{i+1}$ and $C_{i+2}$ are shown. When all the processing cells in the first to fourth regions, or all the processing cells in each region perform operations in the SIMD mode, optical-input control signals are transferred to each processing cell in the column direction via control wires. In this case, all the ALU processors receive the same control signals. When each ALU processor or groups of ALU processors in a particular region perform different operations, the optical-input cells of each ALU processor receive different control signals, which switch logical wiring circuits constituting the control circuits in the ALU processor. In the figure, a control wire 52 extending in the column direction is shown as an example.

In the processing chip shown in FIG. 5, the uneven shape of the processing cells 32 and 34 could lead to local disturbances in the row and column wirings. Because the ALU processor 32 is disposed on the diagonal, however, the outermost shape of the processing cell arrays, that is, the shape of the chip becomes rectangular.

In this processing chip, optically-entered control signals can be used in conjunction with those control signals which are entered electrically via pins. 8-bit signals for data output control, for example, can be input electrically via pins, and 8– 16-bit signals for operation control can be transferred in the form of optical input.

Figure 6:
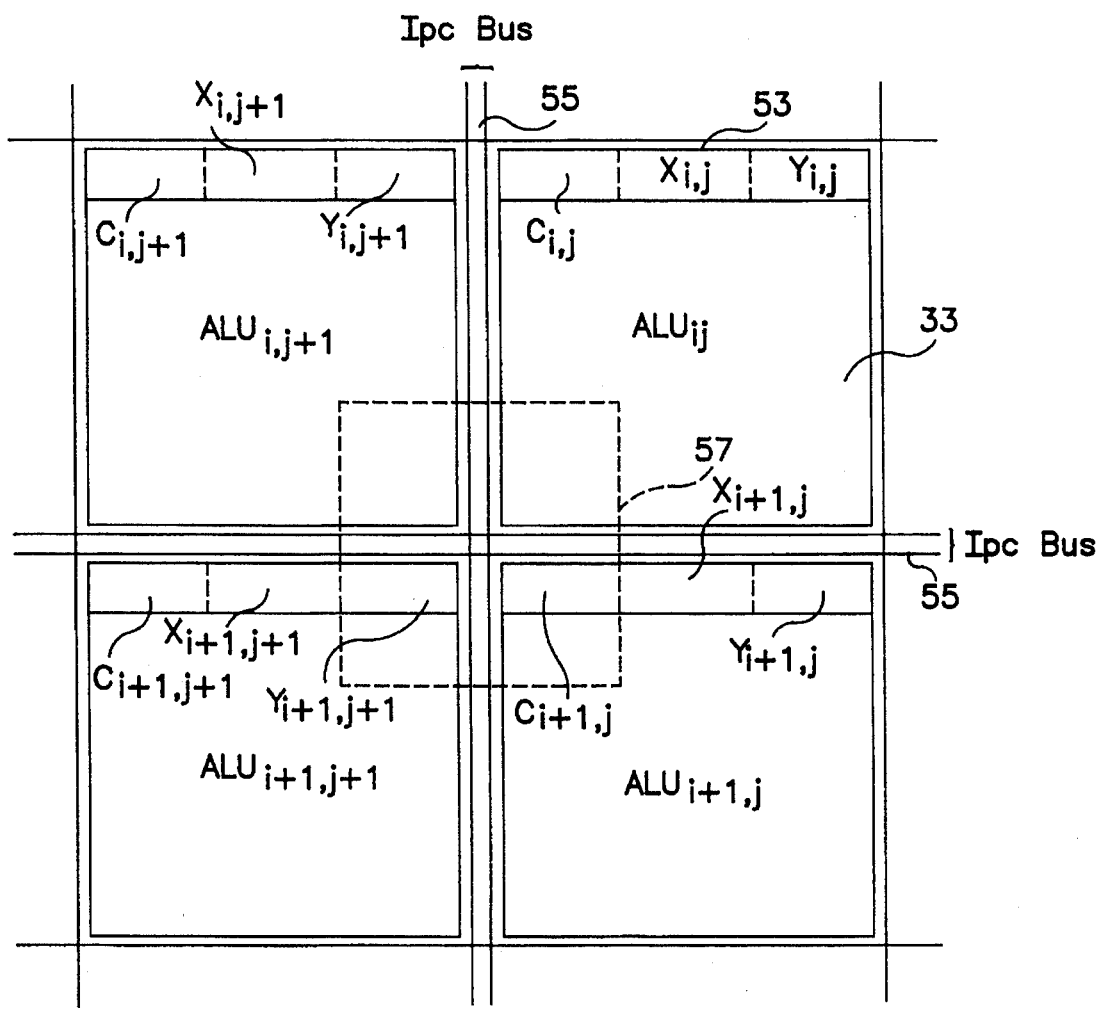
FIG. 6 is a diagram illustrating part of a processing chip comprising a full-ALU type processor.

FIG. 6 shows a diagram illustrating four ALU processors on a full ALU processor chip. Each of the ALU processors 33 has an optical-input cell array. Since optical-input cell arrays 53 consist of those dedicated for control signal input and those for data input, each ALU processor 33 can execute operations independently. The processors are connected with each other by IPC buses 55. In Example 2 in Table 1, 64 bits of optical digital signals consisting of 32 bits of control signals and 2 words (32 bits) of data are input into each ALU processor. Because there are 64 (8×8) processor arrays on a processing chip, optical inputs amount to a total of 4,096 bits. It is impossible to provide 4,096 electrical-signal input connectors on a single chip measuring approximately 17×17 mm with the present level of technology. However, this can be realized with optical interconnection system of this invention, which is described below.

In FIG. 6, the area encircled by dotted lines 57 indicates a layout where optical-input sections of four ALU processors are concentrated to a location. This layout of the optical-input cell arrays in the ALU processor is preferable for optical input in the fiber bundle system, which will be described later.

Figure 7:
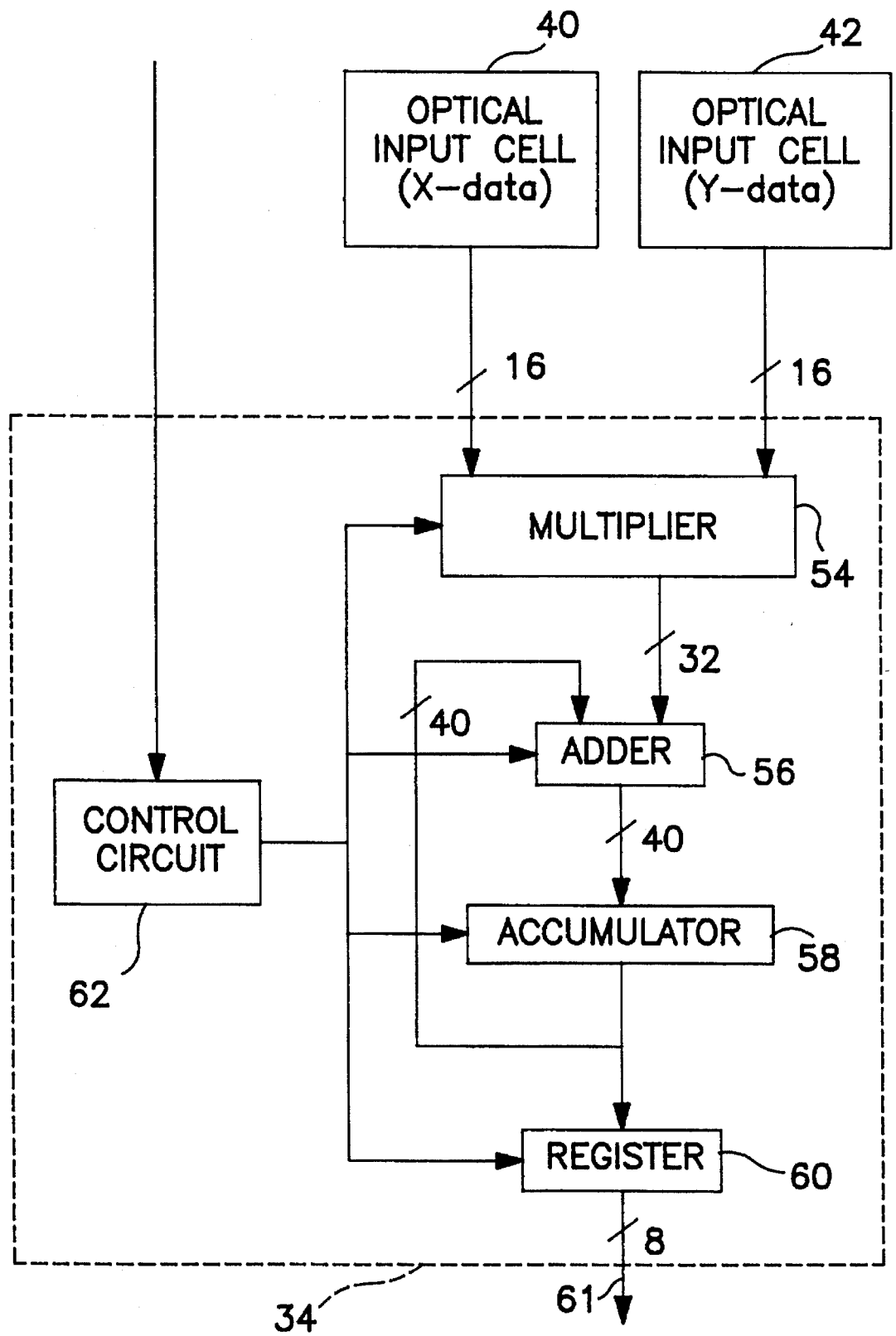
FIG. 7 is a block diagram of an MU processor.

FIG. 7 is a block diagram of the MU processor 34. This processor is a processing cell dedicated for product-sum operations, consisting of a multiplier 54, an adder 56, an accumulator 58, an output register 60 and a control circuit 62. In the MU processor, two 16-bit data values optically entered from the X-data optical-input cell 40 and the Y-data optical-input cell 42 are multiplied in the multiplier 54, and added to the partial product-sum that had previously been obtained and held in the accumulator 58. This operation is executed by a required number of terms, the results are transferred to the output register 60, and output to an 8-bit data path 61 by output control signals in a time-division multiplex mode.

The above operations are executed in the form of pipeline processing by driving the control circuit with external common-control signals. When data and control signals are input at 25 MHz, for example, 135 product-sum operations are executed in approximately 5.4 μs. Common-control signals are optically input or electrically input via pins, while control signals for output control of the output register 60 are input directly from the controller of the control section via electrical connection pins.

Figure 8:
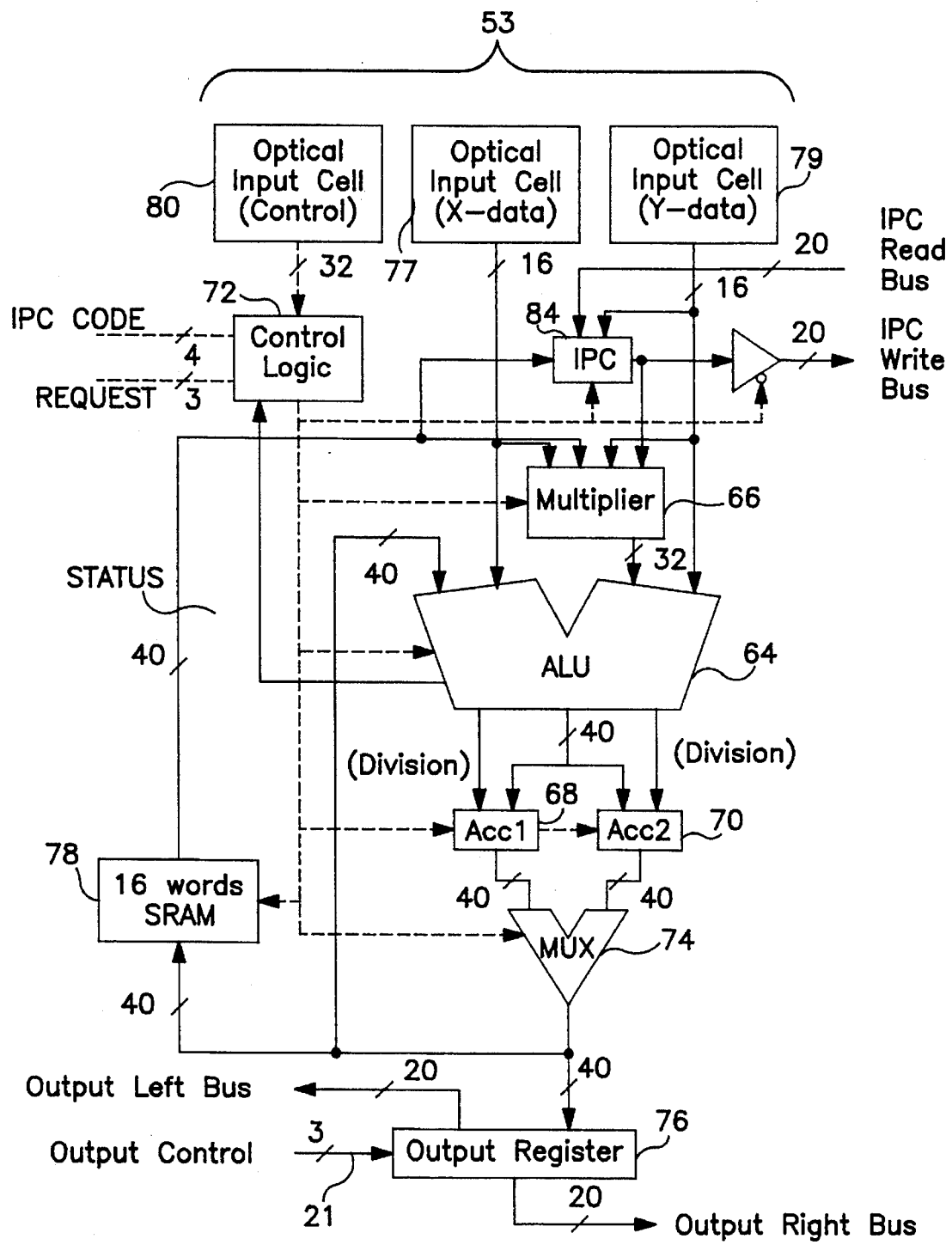
FIG. 8 is a block diagram of an ALU processor.

FIG. 8 is a block diagram of the ALU processor 33 having the optical-input cell array 53. The ALU 64 has functions to execute 16 logical operations, and 16 numerical operations. It also has a flagging function, as found in ordinary processors. It has a multiplier 66 for high-speed operations, which when combined with a 40-bit accumulator 68, can execute product-sum operations at the same speed as the processor for product-sum operations as shown in FIG. 7. The ALU 64 also has another accumulator 70 to execute division operations. Support circuit for executing floating-point operations is provided in the control logic 72. Operation results are transferred to the output registers 76 and 16-word SRAM 78 via the multiplexer 74. The output register 76 is controlled by electrical control signals 21 from the controller of the control section 12 shown in FIG. 1. The main part of the data necessary for numerical operations are entered in two, 16-bit words from the X-data optical-input cell 77 and the Y-data optical-input cell 79. Control signals are provided by 32-bit optical input from the control-signal optical-input cell 80. This signal opens and closes the switching gate of the control logic 72 consisting of logic wiring circuits to perform the time-series switching of functional circuits in the ALU processor 33.

The data supplied to the ALU 64 and the multiplier 66, can be entered electrically from other ALU processors via the internal SRAM 78 and the IPC bus, in addition to optical input. Control signals contain a signal for controlling the IPC gate 84, which can read and write data of a specified ALU processor.

The ALU processor shown in FIG. 8 receives control signals optically, and performs only the control of the output register 76 electrically. The ALU processor, however, may be of a architecture that receives a part of its control signals electrically, as in the case of Example 1 of FIG. 1. In both cases, switching of all the processing circuits is carried out by the microprogrammed pipelined processing operations in synchronism with a 25-MHz clock rate.

Figure 9:
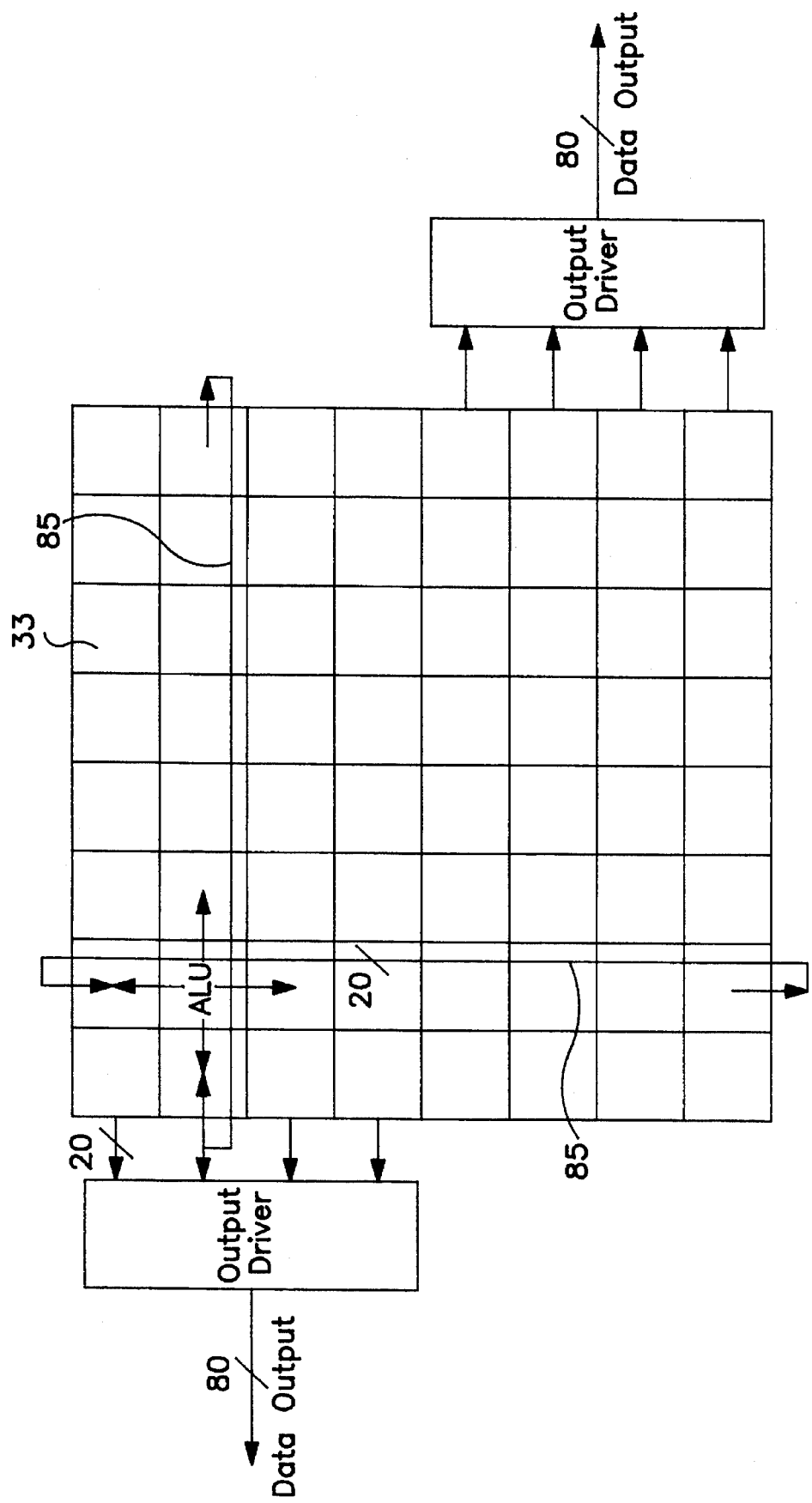
FIG. 9 is a diagram illustrating the configuration of IPC and output buses for a processing chip having only ALU processors.
Figure 10:
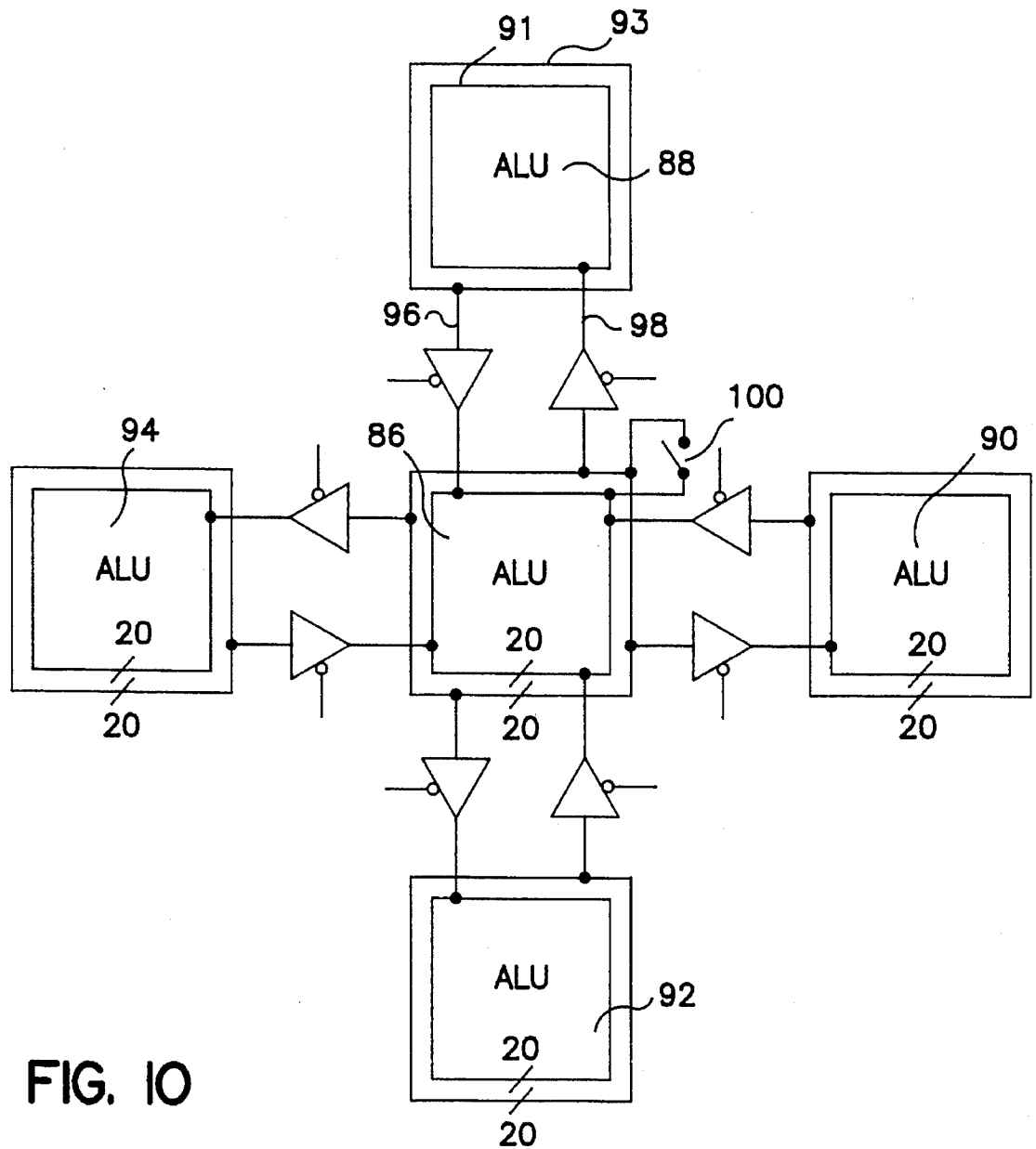
FIG. 10 is a diagram illustrating the configuration of part of the processing chip shown in FIG. 9.
Figure 11:
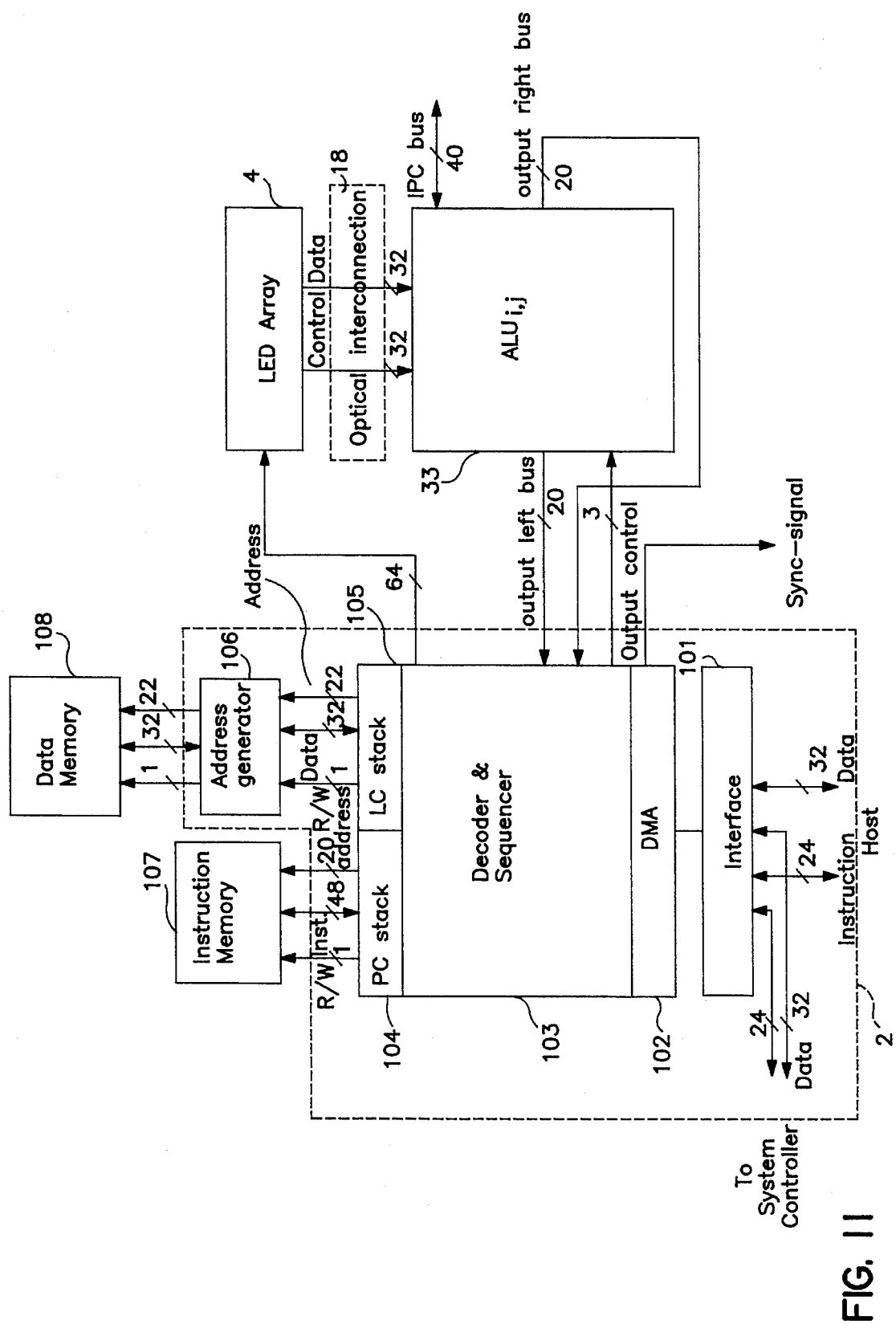
FIG. 11 is a block diagram illustrating part of a computer system all of whose processing cells are ALU processors.

Architectures having enhanced general-purpose processing capabilities are shown in FIGS. 9 through 11. In these architectures, all processing cells are made from ALU processors as shown in FIG. 8. FIG. 9 shows a processing cell array consisting of 64 (8×8) ALU processors 33. In these architectures, IPC buses 85 are provided among ALU processors to make it possible to write and read data to and from the ALU processor 33 to enhance data input/output functions. To unify inter-cell data transfer instructions, data transfer on two channels of IPC buses consisting of 20 bits is carried out by defining neighboring processors as shown by arrows at the end of the processor array. Data output ports are divided into two, and driven in parallel to realize high-speed output.

FIG. 10 shows part of the IPC bus connections around processors in the processing chip shown in FIG. 9. The Figure shows the configuration where the ALU processor 86 is connected to four neighboring ALU processors 88, 90, 92 and 94 via the read IPC bus 96 and the write IPC bus 98. Data transfer is carried out by IPC-bus control codes. Data transfer among the nearest four processors to a given processor is executed directly by control codes. Data transfer among processors other than the nearest ones is carried out by transferring data with IPC-bus control codes. Each processor of the processor array has a matrix number, with rows numbered 1 to 8 from top to bottom, and columns numbered 1 to 8 from right to left. Inter-processor data transfer is carried out between a master processor which requests data transfer and a slave processor to which data transfer is requested. The master processor sends the number of the slave processor requested on the 3-bit buses provided in the row and column directions. The master-slave relation is established as the slave processor detects it. Upon establishment of this relation, the master processor sends the IPC SD code and IPC MODE code to the IPC control-code transfer bus consisting of 4 bits, and the control register of the slave processor receives them. The processor located in between the rows or columns of the master and slave processors receives the IPC SD;IPC MODE=0.1 signal that indicates the data passing direction, allowing the data being transferred to pass. Data transfer is executed immediately after all the processors are brought in the state where sync-signal=1 and stop operation.

Independent and discrete data inputs and control signal inputs to each ALU processor make it possible to overcome the difficulty in simultaneous electrical data transfers to all the cells, and propagation delay, which is an obstacle to higher-speed processing.

The data transfer bus has a bypass switch 100 to improve the fault-tolerant function of ALU processors, and to connect the write and read busses, bypassing the ALU processors.

FIG. 11 is a block diagram illustrating a computer made from only ALU processor cells 33. Instructions and data from the host computer (not shown) are stored in the instruction memory 107 and the data memory 108. The controller 2 has the interface 101, DMA section 102, decoder and sequencer 103, program counter stack 104, loop counter stack 105, and address generator 106. The instruction memory 107 has an instruction code width of 48 bits, and an address space of 20 bits. The data memory 108, on the other hand, consists of one 16-bit word, and an address space of 22 bits which occupies two words. In the case of a high-speed memory, it consists of a 1M SRAM and 32 chips. An SRAM memory consisting of 32 chips arranged as four eight-chip cubic memory blocks are theoretically most suitable for high-speed processing. An economical construction, however, would be the one consisting of a 16k×16bit SRAM and a high-speed DRAM in which data are accessed by DMA. To process a large quantity of data, the data memory should be of a 2-port memory each of which consists of 16k×16bit SRAM and 1M×16bit DRAM, with data exchange between these SRAM and DRAM being carried out by processors.

There are two types of instruction codes consisting of 48 bits, of which a typical instruction code field having 32 bits of processor control signals consists of the following components. The operand read registers for holding the 6-bit transmit codes of the ALUs and multipliers, with 4-bits secured for their outputs. ALU functions, that is, 32 logical operations and 32 arithmetic operations, are designated by 5 bits. Multipliers and operations relating to them are controlled by 4 bits. 16-word internal SRAM and read/write control signals consist of 5 bits in total.

IPC-bus control signals consist of a total of 6 bits.

| IPC Input | Function (IPC operand selection) |
|---|---|
| 00 | Hold |
| 01 | Load MEMORY |
| 10 | Load IPC read bus |
| 11 | Load data X |
| IPC SD | Function (IPC source-destination) |
| 00 | Left-Right |
| 01 | Right-Left |
| 10 | Top-Bottom |
| 11 | Bottom-Top |
| IPC MODE | Function (Load IPC mode bits from control register) |
| 00 | Shifting<br>IPC Read bus data latched in the input register.<br>IPC Write bus driven by the output register at the end of the row |
| 01 | Bypass<br>IPC Read bus drives the IPC Write bus. |
| 10 | Transmit<br>Output register drives the IPC Write bus. This mode identifies the source processor for broadcasting data to a (programmable) number of other processors. |
| 11 | Receive<br>IPC Read bus drives the IPC Wire bus, and Read data is latched in the input register. |

Individual ALU processors 33 receive independent IPC-bus control signals from their respective controllers 2 via the LED array 4 and the optical interconnection section 18. The bit width of the IPC bus is 20 bits. Consequently, high-speed processing is possible because input to each ALU processor is executed by an optical-input cell, IPC bus, and internal SRAM at 1 or 2 clock cycles, and the pipeline architecture is employed.

Output data have a 20-bit width, and are controlled by 3-bit electrical control signals. As in the case of IPC-bus control, output-register control can be performed by optical signals.

Figure 12:
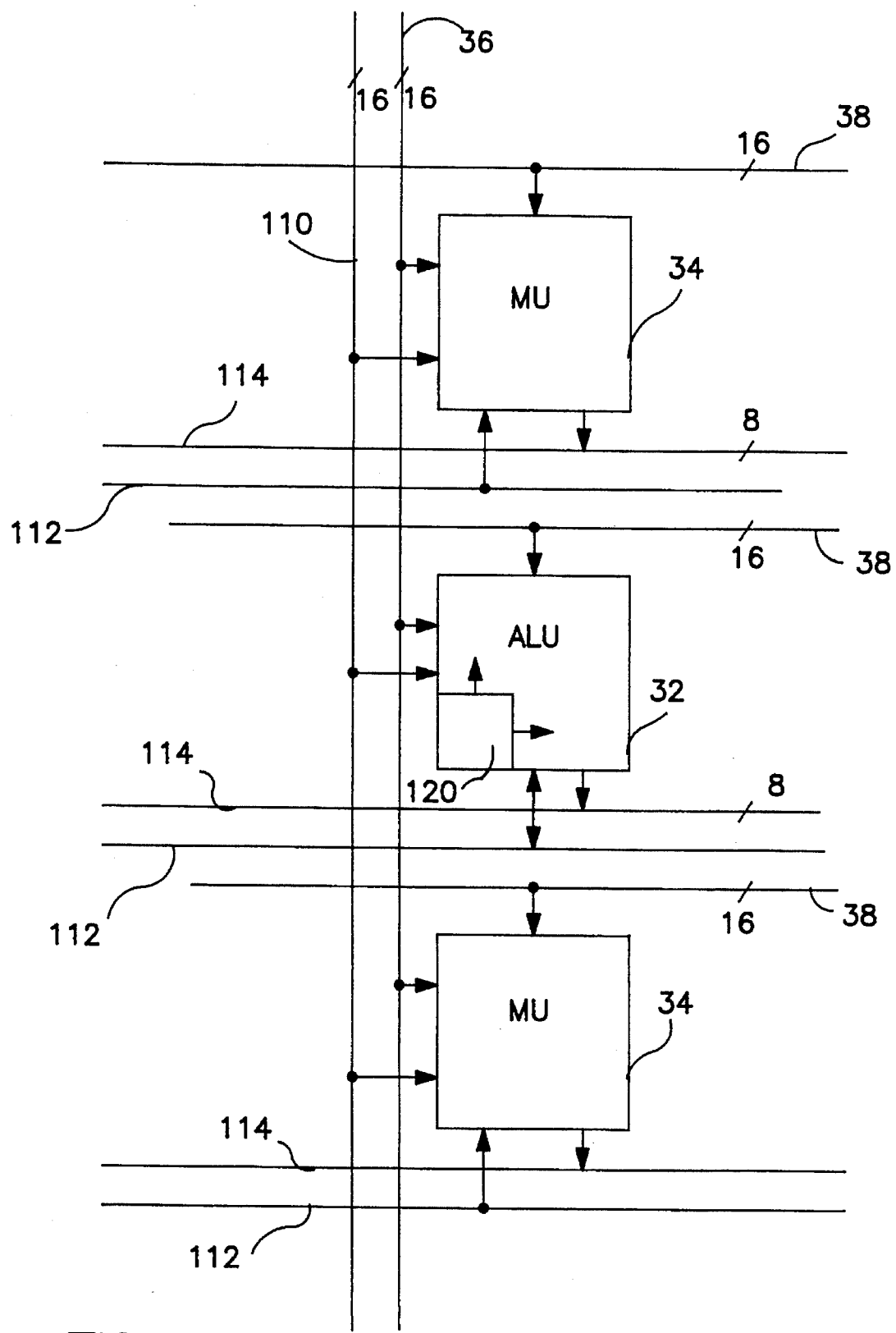
FIG. 12 is a diagram illustrating the configuration of the input/output wirings of a processor array consisting of MU and ALU processors, which instructions and data are entered in the form of optical signals.

FIG. 12 shows the configuration of input/output wirings when instructions and data are input optically to a processor array consisting of MU processors and ALU processors. Control signals (16 bits) are entered to the optical-input cell 120 of the ALU processor 32. In addition to the 2×16-bit optical-input data signal wires 36 and 38, control signals are entered via 16-bit control signal (instruction) wires 110 and the input/output control signal wires 112 to the processors 32 and 34. Data are output in parallel for each row via the data output wires (8 bits) 114 to the outside of the chip in parallel with each row. In this case, the number of pins on the processing chip does not increase. Instructions to each ALU processor can be designated independently. Consequently, by making effective use of the internal SRAM, consecutive operations can be executed without outputting to the outside of the cell, that is, without reentering data optically.

Figure 13:
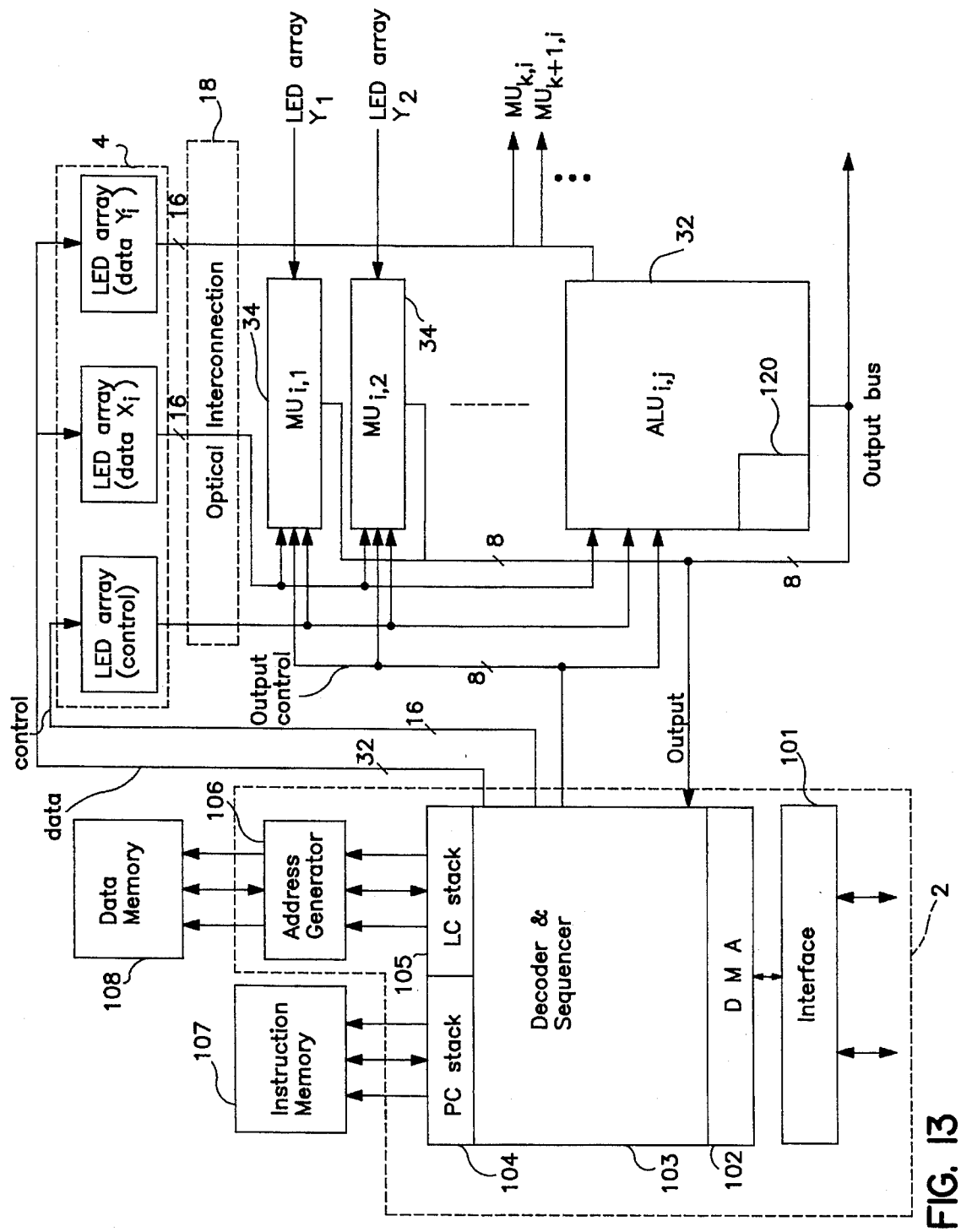
FIG. 13 is a block diagram illustrating controllers and processor cells forming part of the processor array of FIG. 12.

FIG. 13 is a block diagram of controllers and processor cells for controlling the processor array shown in FIG. 12. In the case of the processing chip shown in FIG. 2, a total of 32 controllers 2 are provided on each row (column) in each region. The controller 32 is of the same architecture as that shown in FIG. 11, so like component elements are indicated by like numerals. In matrix-vector processing, the controller for each row (column) in each region has the same program, and reads the data necessary for the matrix-vector processing from its data memory 108 mapped at the time of compilation (MIMD or SIMD operations). 16 bits of control signals from the controller 2 are entered optically to the optical-input cell 120 of the ALU processor 32 via the LED array 4 and the optical interconnection section 18, and transferred electrically from the ALU processor 32 to the MU processor for the same row (column). In processing other than the matrix-vector processing, 32 ALU processors located on the diagonal and their respective controllers execute a maximum of 32-instruction SIMD operations. 8 bits of output control wires control the output registers of the ALU processors 32 and the MU processors 34, and the operation results are transferred from the MU processors 34 to the ALU processors 32 for continued processing by optically input control signals as necessary. 32-instruction 32-value data-flow processing can be executed in parallel independently by the ALU processors only.

Figure 14:
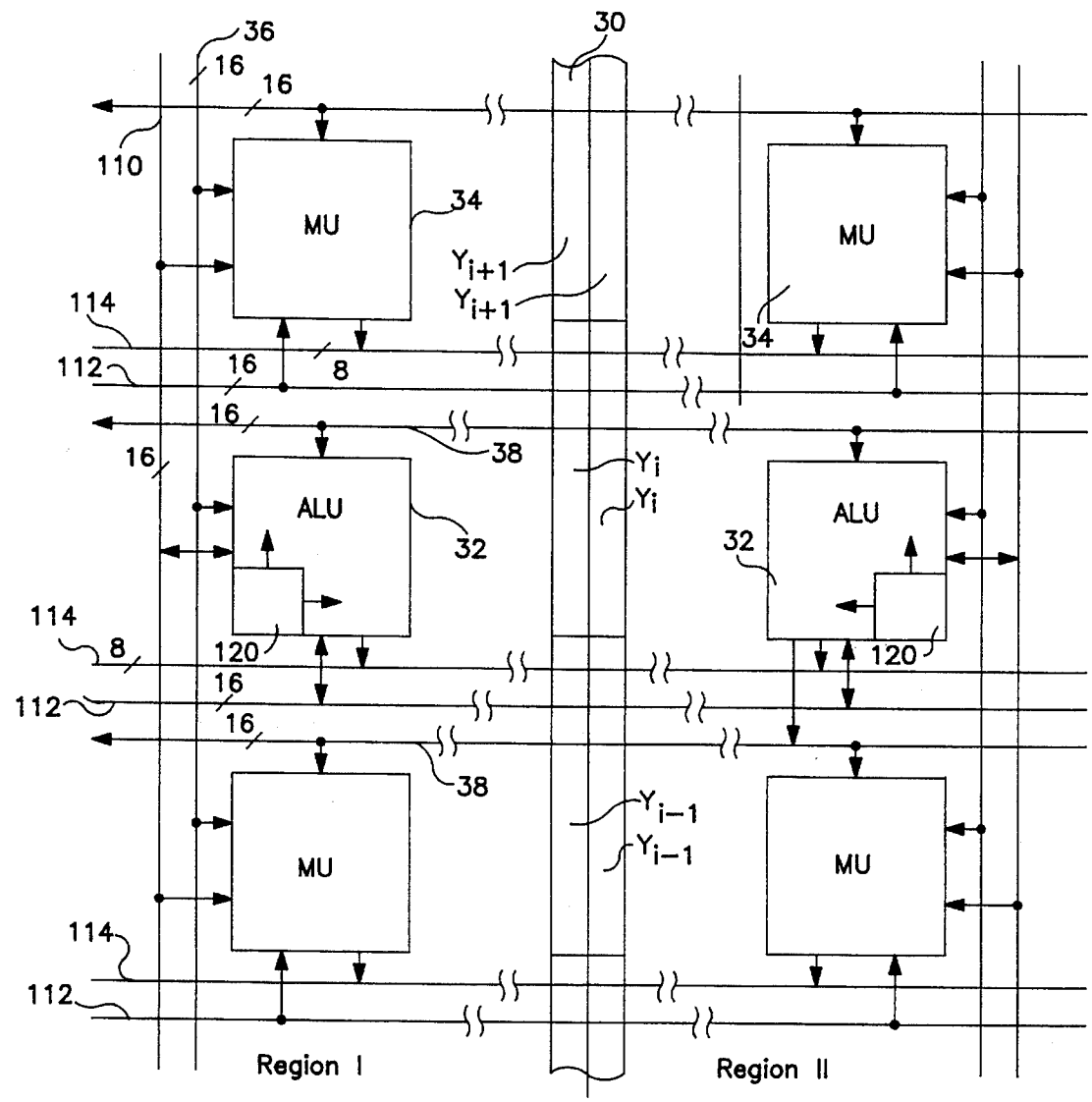
FIG. 14 is a diagram illustrating the configuration of input/output wirings for not only the time-series processing of consecutive operations within an individual ALU cell, but also for control for data transfer to other ALU processors.

FIG. 14 is a diagram illustrating the configuration of input/output wires when consecutive operations are not only subjected to time-series processing by a particular cell but also transferred to other ALU cells. The same input/output wires as shown in FIG. 12 are indicated by the same reference numerals. Now, an example of vector processing will be described. Vector-matrix operations are executed in the region I bordering the Y-data optical-input cell arrays 30. The operation results are temporarily held in the output register to immediately move to succeeding vector operations. The ALU processors 32 in the right-hand region II read previous vector operation results from the processors in the region I to execute arithmetic or logical operations. Eight vector operation results from the left-hand processor arrays can be arranged in the order of size by the right-hand ALU processors on the same row, using the holding SRAM.

Figure 15:
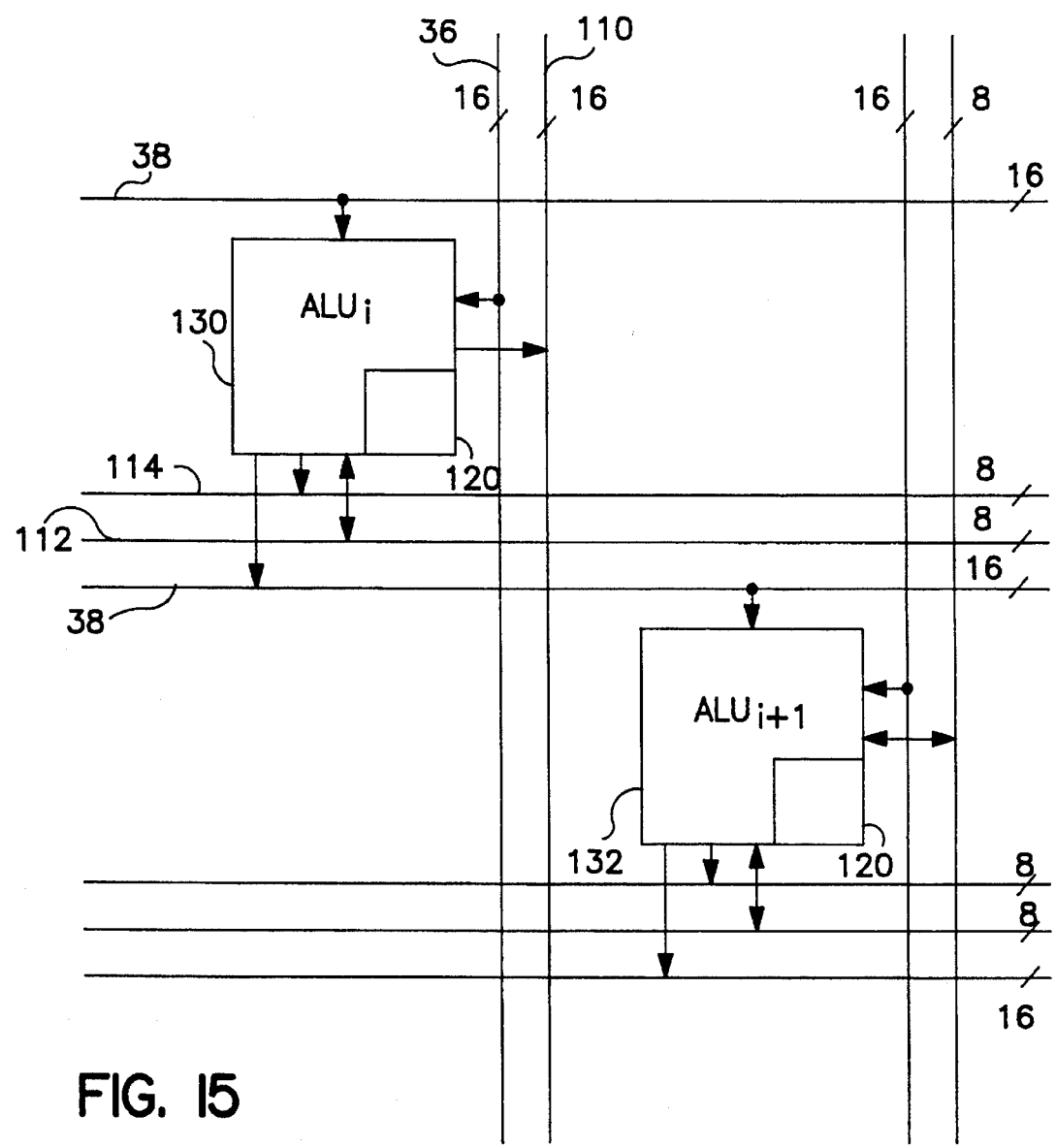
FIG. 15 is a diagram illustrating the configuration of input/output wirings when ALU cell arrays arranged on the diagonal are used in a manner much like pipeline processing stages.

The configuration of input/output wires shown in FIG. 15 is designed for operations in which the ALU processor arrays arranged on the diagonal shown in FIG. 2 are used in a pipeline architecture, and is suitable for complicated computational processing. The operation results by the ALU processors (i cells) 130 are output to the $Y_i+1$ optical-input data wire 38 to be used as input for the ALU processors (i+1 cells) 132 by input/output control signals. The ALU processors (i+1 cells) 132 process the SRAM data in the same cell, or the external $X_{i+1}$ optical-input data, and the ALU processor (i cell) 130. Pipeline processing is executed by sending this processing flow every clock along the ALU processors on the diagonal. This processing flow can be provided independently in the four regions and in parallel.

FIGS. 12–15 described above show those architectures which put emphasis on the performance of vector-matrix processing, sacrificing general-purpose processing functions.

Figure 16:
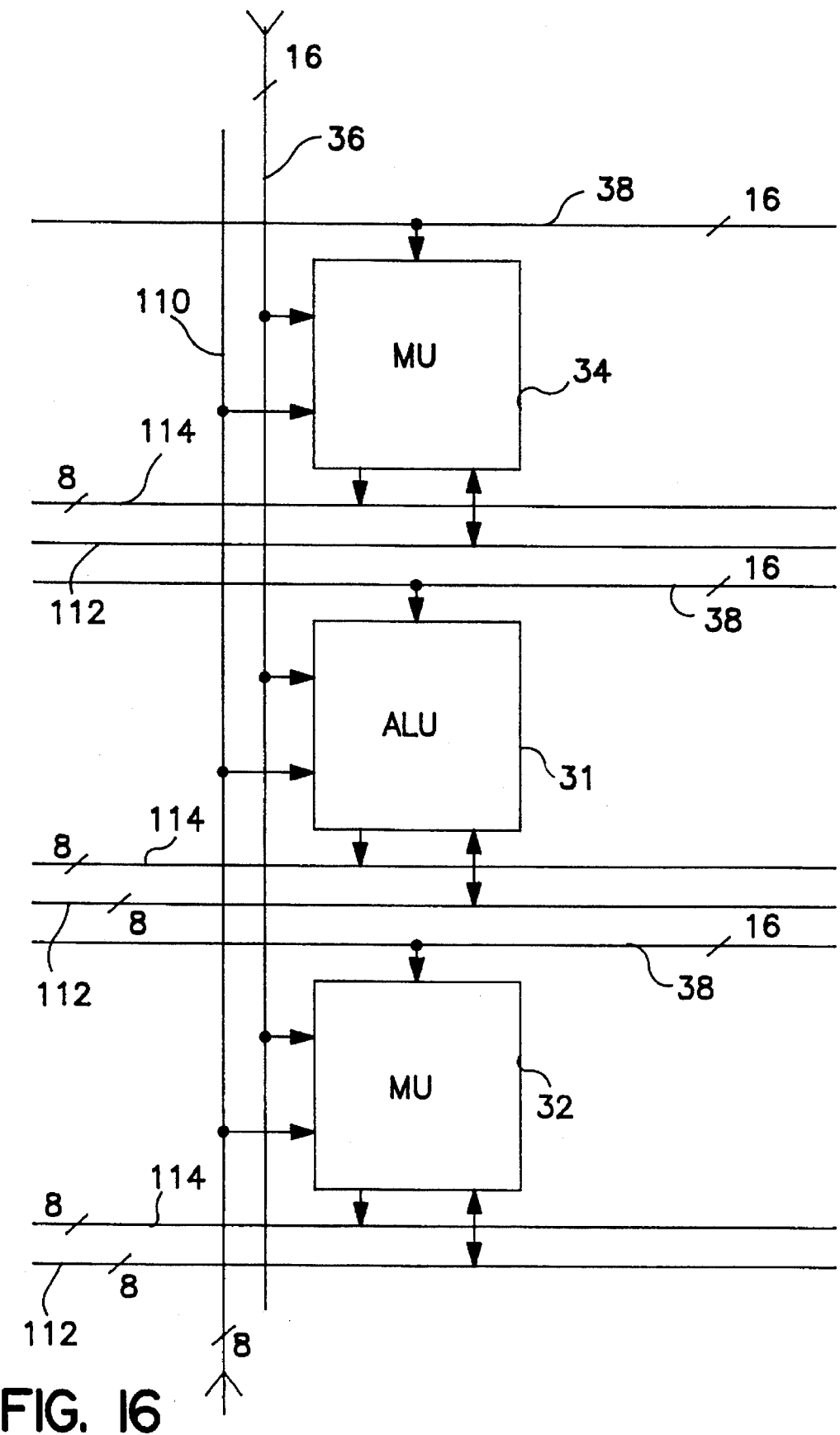
FIG. 16 is a diagram illustrating the configuration of input/output wirings when only data signals are entered optically.

In FIG. 16, where all control signals are executed electrically, control signals are limited to a few instruction inputs, such as a single instruction for all regions, or 4 instructions for 4 regions, due to limitations in the number of allowable pins of the processing chip shown in FIG. 2. That is, 16-bit control signals are entered into each of the four regions from 16 pins (64 pins for all regions). With this arrangement, however, there can be two cases; i.e., a case where the same signals are sent to all four regions, and a case where different signals are sent to all the four regions. In the case of the same signals for the four regions, vector operations in which 256 processing cells execute the same operations (if the most efficient operations are executed with the pipeline architecture, operation speed could be 6.4 GOPS at 25 MHz), or if the same operations (multiplication and addition are executed at 800 MOPS under the same conditions as above) are executed by 32 ALU processors. In the case of different signals for the four regions, operations are executed by different instructions for each of the four regions. That is, there are combinations of four regions: vector operations, arithmetic operations and logical operations. For vector operations, 64 parallel processing cells are combined into a group; and for the four arithmetic operations by ALU processors, eight parallel processing cells are combined into a group to process data using the same program.

Aside from the 2×16-bit optical-input data signal, the control signals on lines 36 and 38 are entered into each processor in each region via an 8-bit control signal wire (instruction) 110 and an 8-bit input/output control signal wire 112. Data are output in parallel for each row to the outside of the chip via an 8-bit data output wire 114. Consequently, the number of pins becomes 256 (8×8×4). Data from the eight processing cells connected to the data output wire 114 for each row are sequentially provided in the form of multiple words by output control signals from the output register to the outside of the chip for storage in the external memory.

Figure 17:
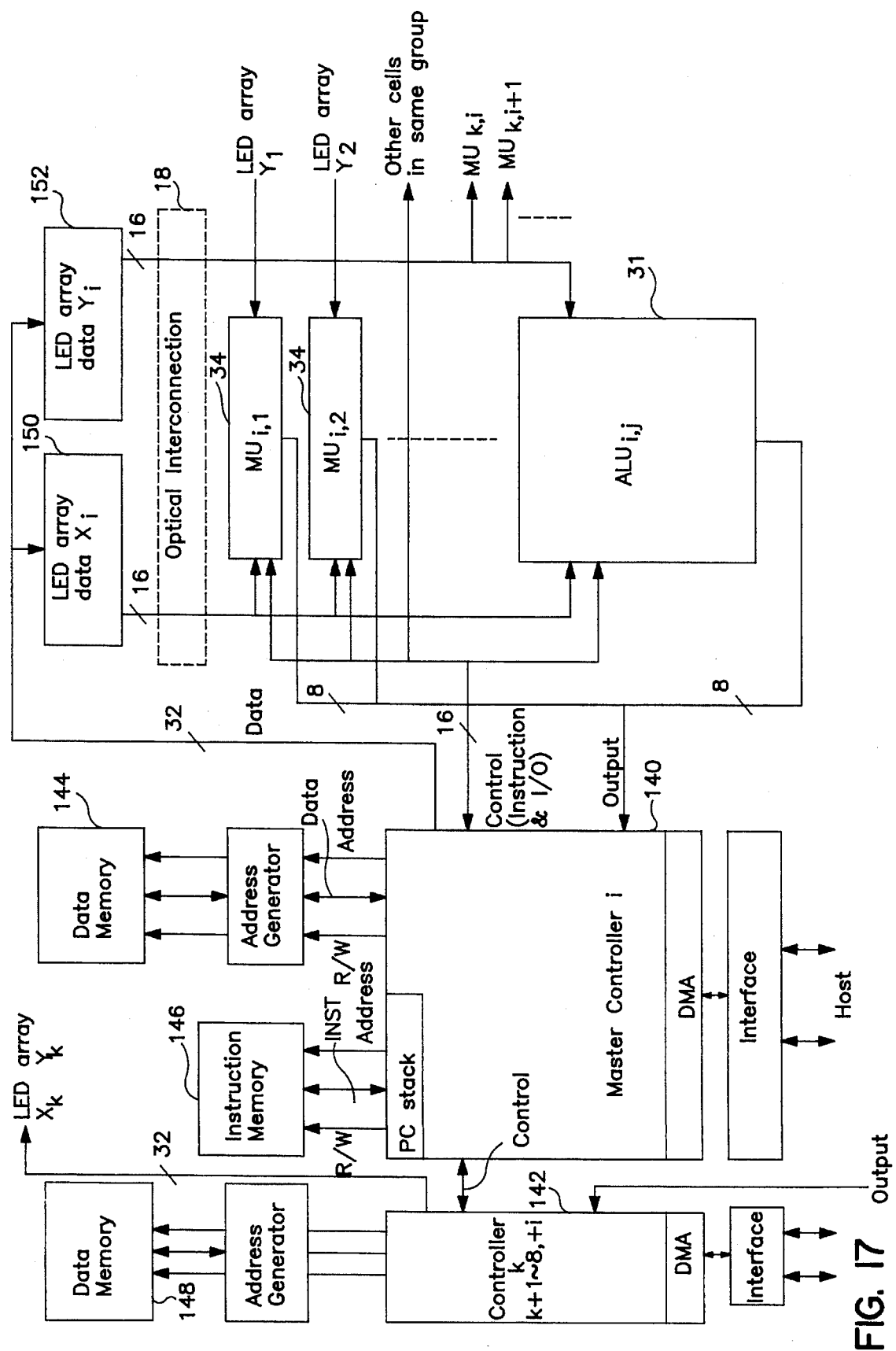
FIG. 17 is a block diagram showing controllers and processors forming part of the processor array of FIG. 16.

FIG. 17 is a block diagram illustrating part of the computer system including processing cell arrays shown in FIG. 16. One group consists of eight ALU processors 31 and fifty-six MU processors 34, and is controlled by a master controller 140 and eight data-supply controllers 142. The execution program is stored in the controller 140 only, which generates the same control signals to each processing cell. Control is transmitted by 16-bit electrical signals. A data-supply controller k is provided for each of the $X_k$ and $Y_k$ data (32 bits) in a region of the optical-input cell arrays arranged crisscross as shown in FIG. 2. The $X_i$ and $Y_i$ data are read and output by the data memory 144 of the master controller 140. The other seven data pairs $X_k$ and $Y_k$ are read by the data memory 148 annexed to the controller k. At the same time, the instruction address of the micro-program read by the data memory 146 of the master controllers 140 is transmitted to the controller k, and is entered into the optical-input cells $X_k$ and $Y_k$. The optical-input cell arrays are arranged crisscross on the chip, with one group consisting of eight X optical-input cell arrays and eight Y optical-input cell arrays. The data of the controller i are entered to eight processor cells on the row i of the same group via the LED array $X_i$ 150. Similarly, Data are entered as the same signals to eight processor cells of the column i via the LED array $Y_i$ 152.

Next, an optical interconnection block using project lens systems will be described, referring to FIGS. 18, 19, 20A and 20B.

Figure 18:
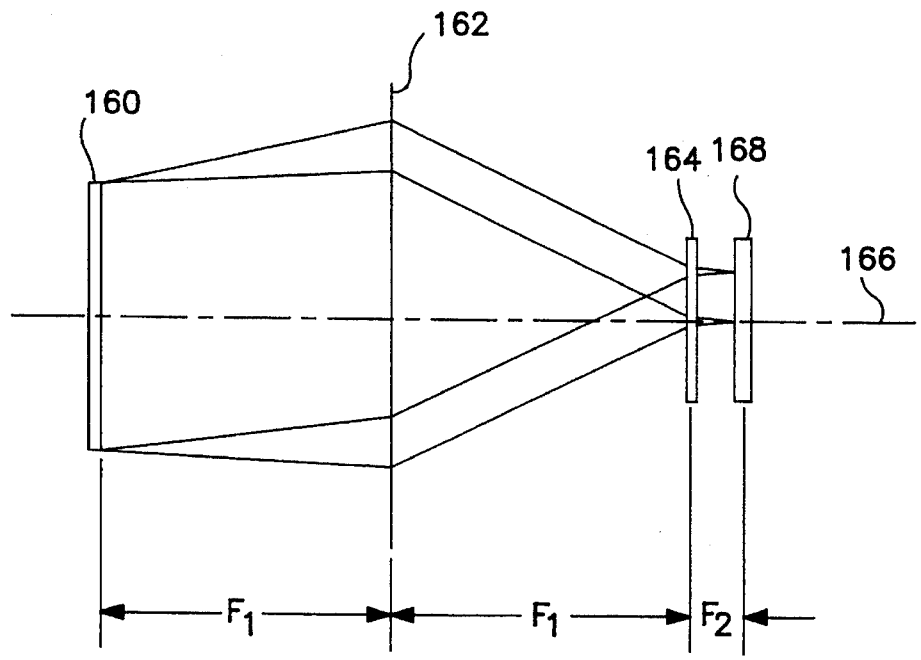
FIG. 18 is a layout diagram of an optical-input lens system.

FIG. 18 is a layout diagram of an optical-input lens system. The optical-input lens system consists of an LED array 160, projection lens 162, and micro-lens array 164. These three components are positioned in such a fashion that the LED array 160 and the micro-lens array 164 are positioned perpendicularly to the optical axis 166 at a focal distance $F_1$ before and behind the projection lens 162. That is, the telocentric layout with respect to the projection lens 162 allows LED output light to reach each micro-lens of the micro-lens array 164, thus making the intensity distribution of each element of the LED array 160 as uniform as possible over the entire surface of the micro-lens array 164. The array of micro-lenses, which are fabricated at uneven pitches on a glass substrate, has 64 elements, the number of optical-input data cells. A processing chip 168 is positioned perpendicularly to the optical axis 166 at a focal distance $F_2$ of the micro-lens array 164.

Figure 19:
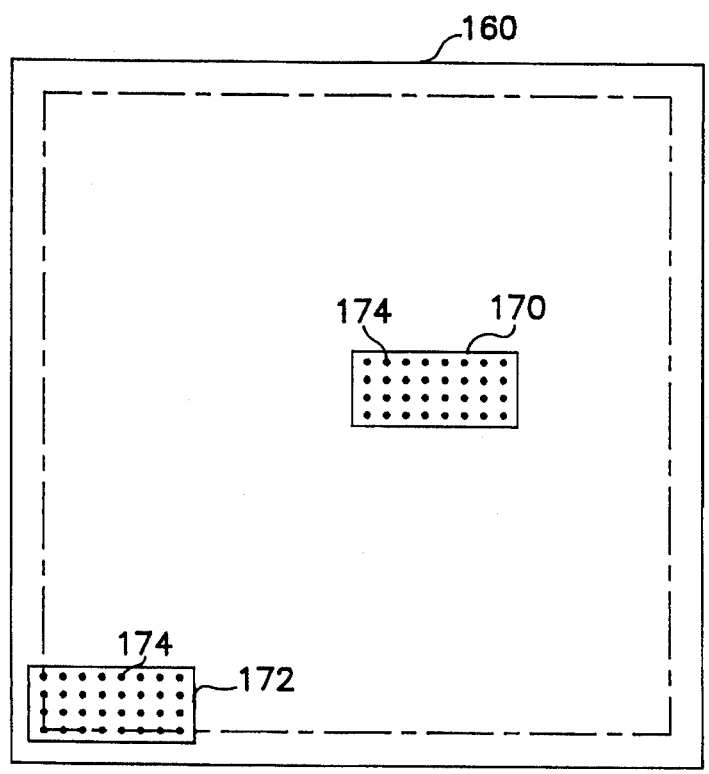
FIG. 19 is a diagram illustrating the state where data are entered into an LED array.

FIG. 19 shows an LED array 160 when only data signals are entered optically. This LED array is a square array having 32×32 elements arranged at 1 mm spacings. Each element is driven independently and in parallel. Inputs to sensor cells are fed from 1024 LED elements in units of a total of 32 elements of two 16-element data widths in each neighboring region; in vertical combinations of 4 rows×8 columns to the Y sensor cells, in horizontal combinations of 8 rows×4 columns to the X sensor cells for the processing chip shown in FIG. 2. FIG. 19 shows A zone 170, and B zone 172, both consisting of elements fed in 4 rows×8 columns combinations. Point 174 indicates an LED element. An individual element 174 in each zone transmits digital information to the light-receiving sensors of the corresponding optical-input cell by luminescence.

Figure 20A:
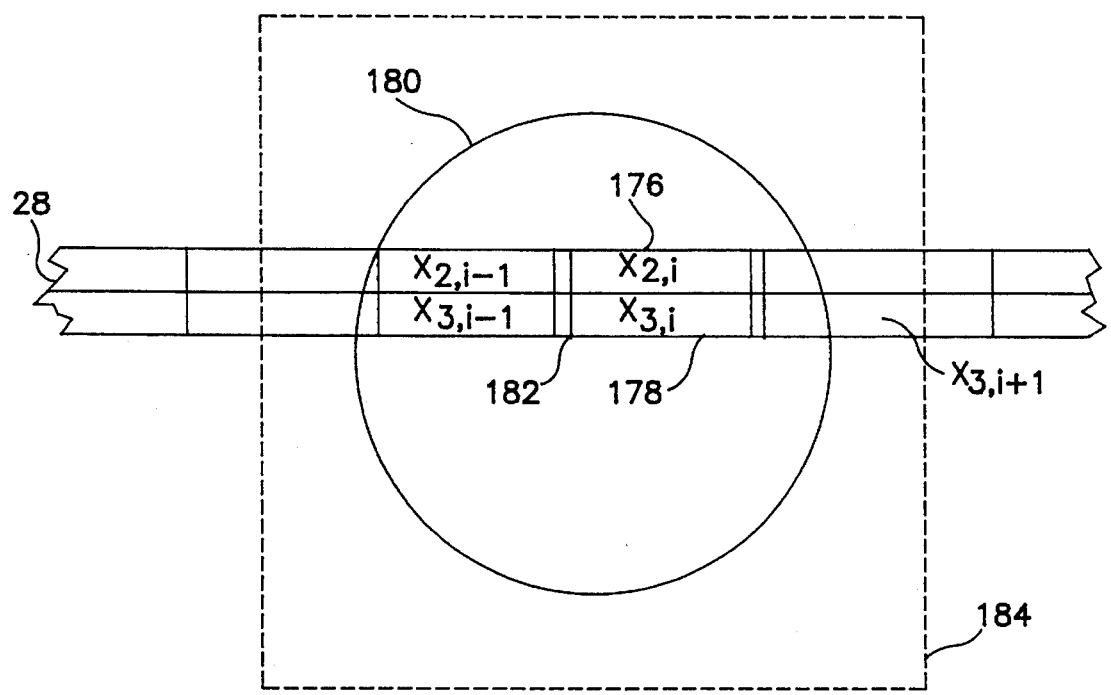
FIG. 20A is a diagram illustrating the principle of entering signals from a square-matrix LED array into a required optical-input cell.
Figure 20B:
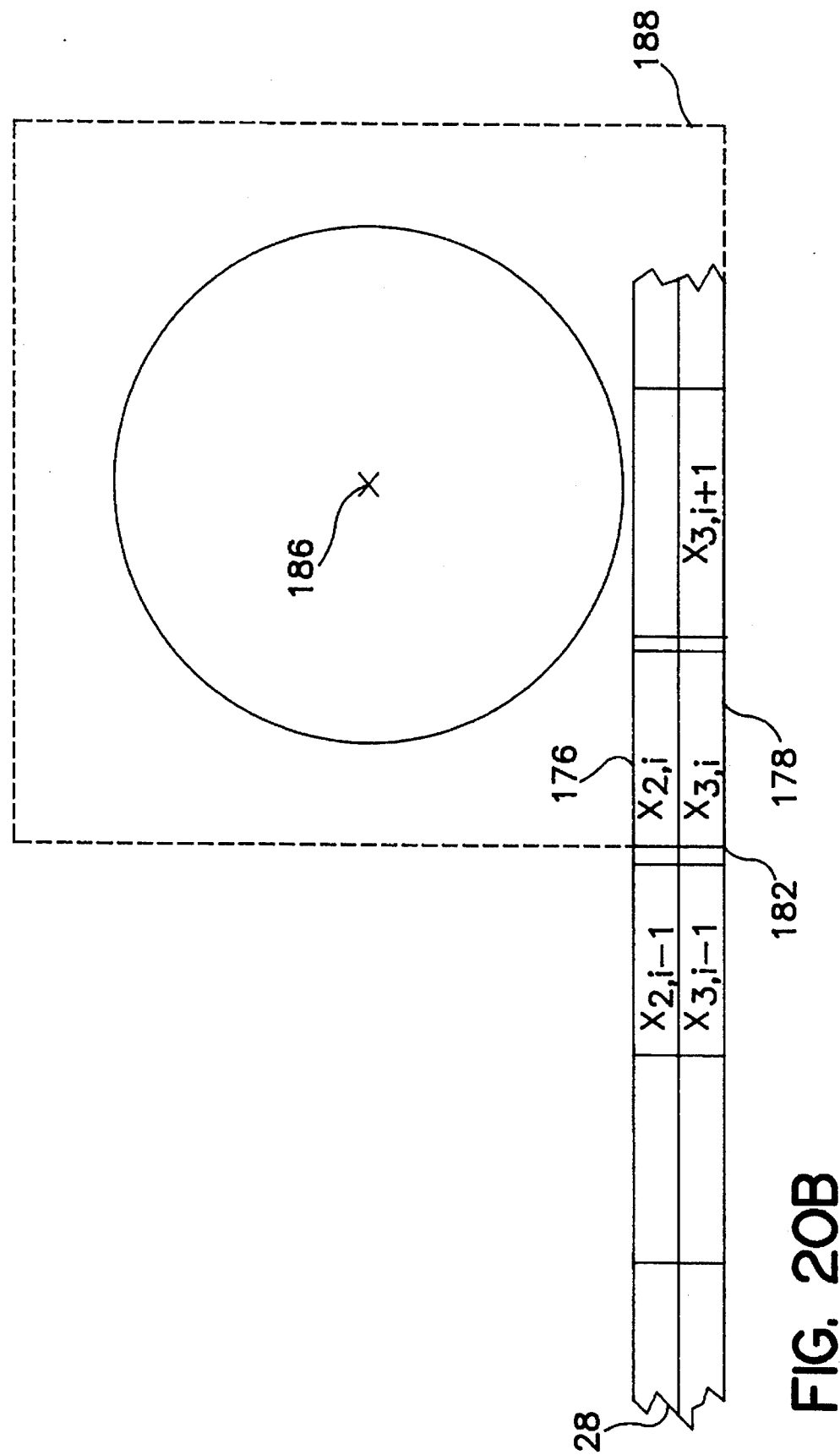
FIG. 20B is a diagram further illustrating the state of entering signals from a square-matrix LED array into a required optical-input cell.

FIGS. 20A and 20B are diagrams illustrating the principle of inputting information from the square LED array to a desired optical-input cell of the X-data optical-input cell array 28. FIG. 20A shows the layout of a micro-lens for inputting the 4-row ×8-column LED elements in the A zone 170 of FIG. 19 to an $X_{2,i}$ optical-input cell 176 and an $X_{3,i}$ optical-input cell 178. When the center 182 of the micro-lens 180 is aligned with the left lower corner of the $X_{3,i}$ optical-input cell 178, an image on the LED array 160 is brought into focus on an LED array image region 184. Consequently, the 32 elements in the A zone 170 of FIG. 19 agree with the light-receiving sensors of the $X_{2,i}$ and $X_{3,i}$ optical-input cells. FIG. 20B shows the layout of a micro-lens for inputting the 4-row×8-column LED elements in the B zone 172 in FIG. 19 to the $X_{2,i}$ optical-input cell 176 and the $X_{3,i}$ optical-input cell 178. An LED-array image at a position of the micro-lens center 186 is indicated by numeral 188. An image in the B zone 174 is caused to focus exactly on the $X_{2,i}$, $X_{3,i}$ optical-input cells by shifting the center position of the micro-lens with respect to the optical-input cell array 28.

This procedure explains a principle of allocating 1024 LED elements to every 32 LED units on the optical input cell arrays. That is, image information can be input to all the optical-input cell arrays (FIG. 2) disposed crisscross in the middle of the processing chip 168 by properly disposing the zone fed from the LED array 160.

Consequently, the array pitch of the micro-lens array 164 is not constant, but varies lens by lens. As noted earlier, the pitch of LED elements is 1 mm, and the light-receiving sensor pitch of the optical-input cell is 100 µm. As a result, the reduction factor of the optical system is 1/10. The LED luminance of more than 230 µW/st needed to drive the optical-input cell at a 100% duty cycle can be produced by assembling discrete LED chips into arrays.

Figure 21:
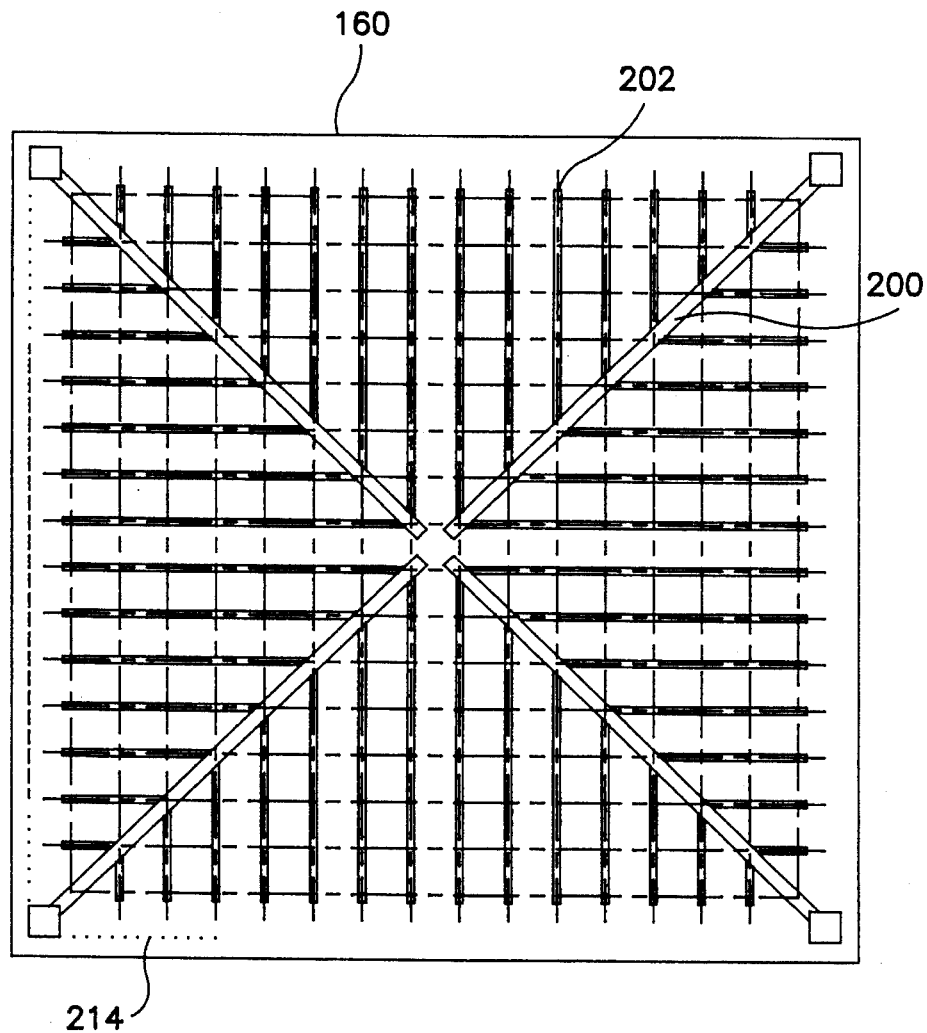
FIG. 21 is a diagram illustrating common conductors for the negative electrodes of an LED chip on a carrier.
Figure 22:
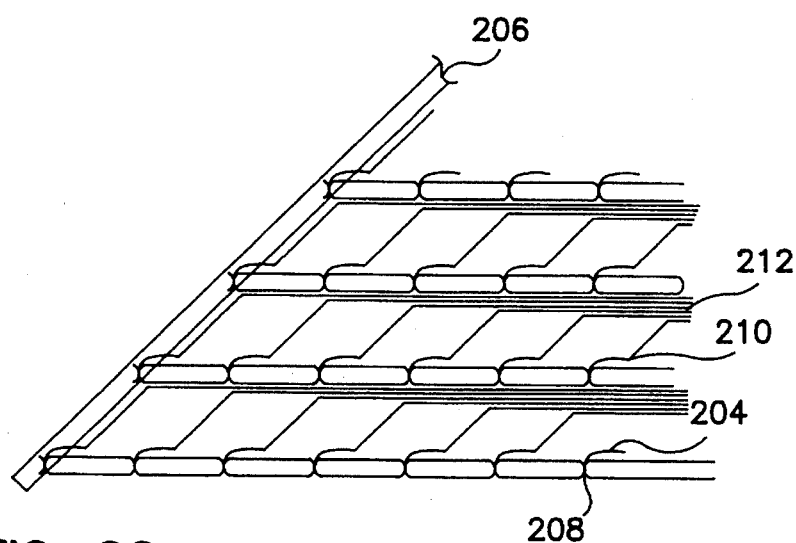
FIG. 22 is a diagram illustrating common conductors for the positive electrodes of an LED chip on a carrier.

FIGS. 21 and 22 shows electrode wirings for driving the LED array 160 at a 100% duty cycle. FIG. 21 is a diagram of common conductors for negative electrodes of the LED chip on a chip carrier. Branch conductors 202 are connected to main conductors 200 disposed on the diagonals. The LED is bonded to the conductors at 1 mm spacings. As shown in FIG. 22, a driving positive electrode 212 has a solder pad 210 in the vicinity of each LED 208, and the LED positive electrode is connected to the pad with a lead wire 204. Thus, up to 16 printed circuit lines for positive electrodes are formed between the branch conductors.

Connection to the LED driver is effected by bonding directly to the circuit board using a bonding pad 214 provided around the carrier at 125 µm spacings by lead wires, or by fixing 1024 pins to an enlarged peripheral part of the array carrier. Since the LED array is 32×32 mm in size, expanding to 60×60 mm is sufficient to fix 1024 pins at 1.5×1.5 mm spacings.

Figure 23:
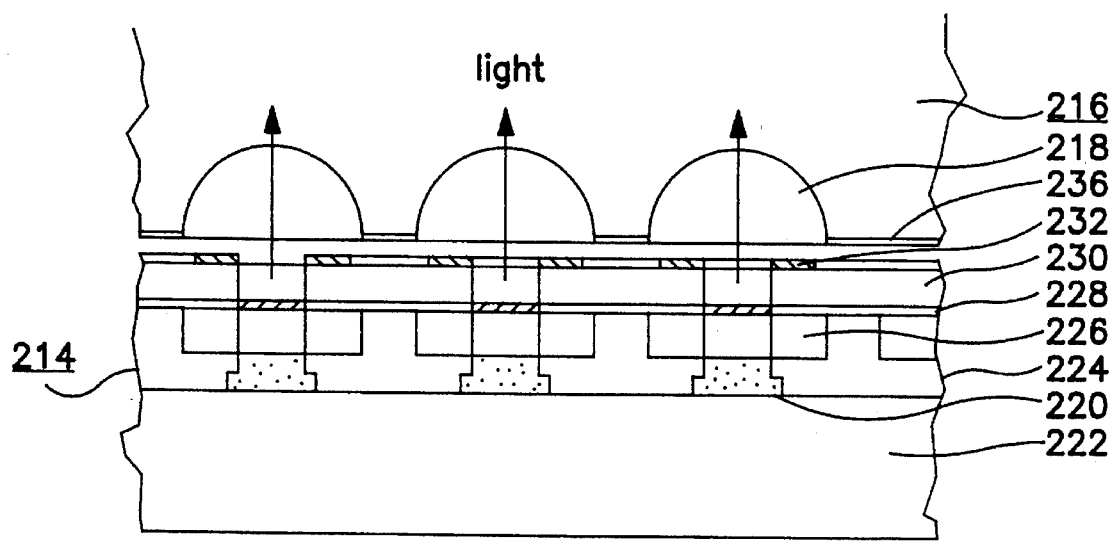
FIG. 23 is a cross section of an LED array which is disposed in direct connection with a micro-lens array.
Figure 24:
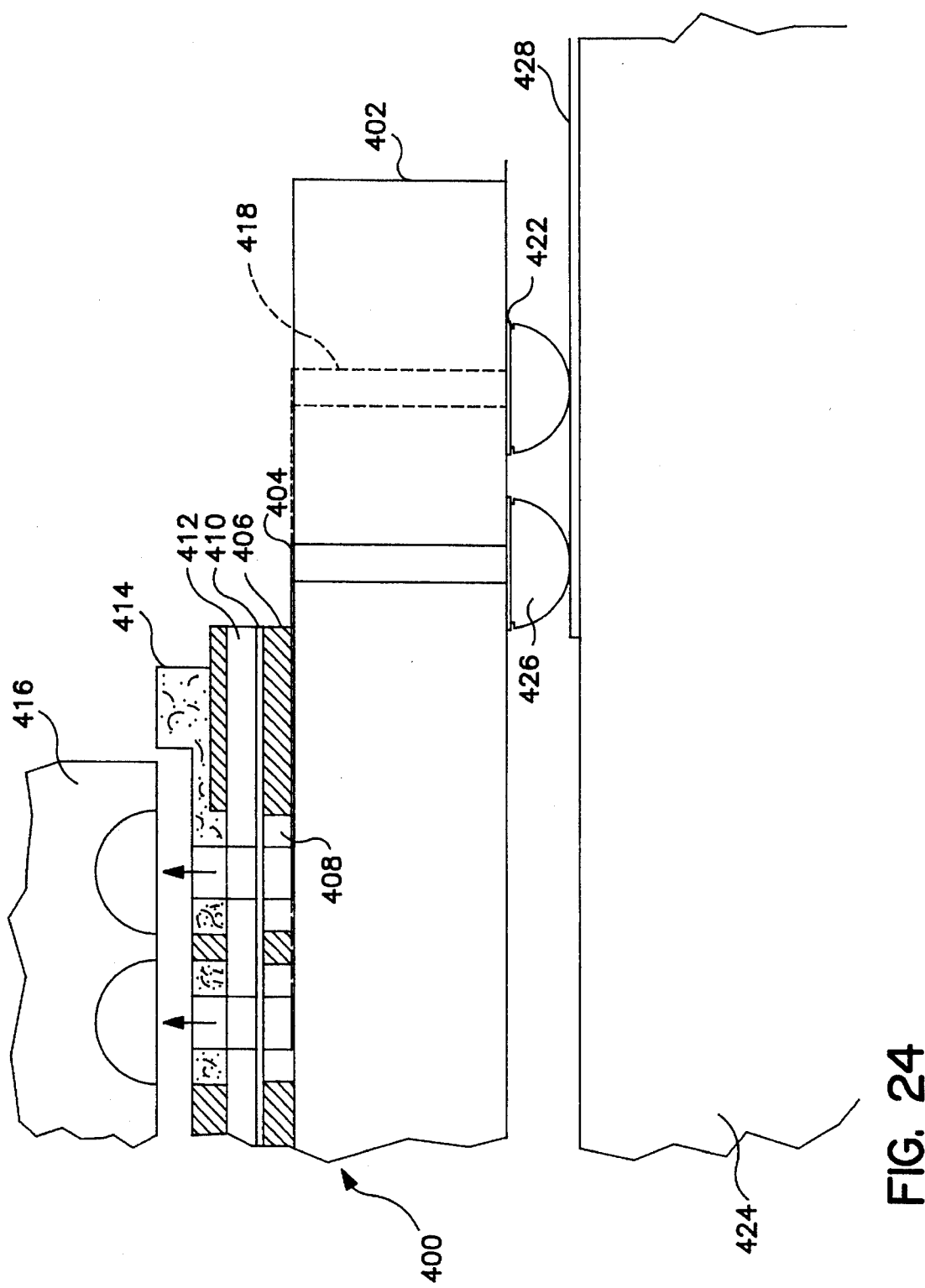
FIG. 24 is a cross section of the periphery of a micro-lens array and an LED array which are disposed in direct connection with each other.
Figure 25:
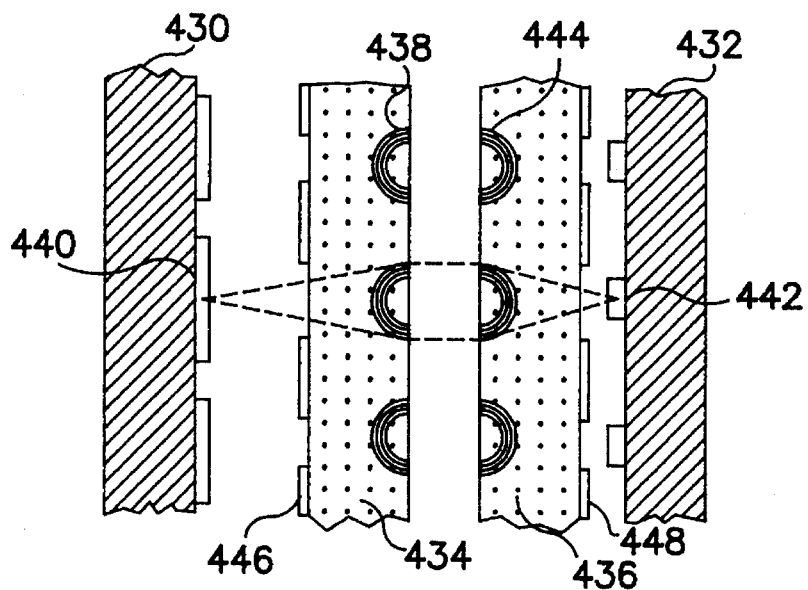
FIG. 25 is a diagram illustrating the principle of an optical interconnection block between an LED array and an optical-input cell on a processing cell.

Other optical interconnection methods are described with reference to the following drawings. FIGS. 23–25 show the configuration where the LED array 214 and the micro-lens array 216 are closely disposed, without using the projection lens 162 shown in FIG. 18. An LED carrier covering the entire surface of a processing chip is employed so that the LED array formed on the carrier can enter information optically to any part of the processing chip. When the pitch of the light-receiving sensor of the optical-input cell is 100 µm and the light-receiving sensor is approximately 20-µm square, LED chips are formed at 100 µm spacings immediately above the light-receiving sensor to focus light into the 20-µm square light-receiving sensor via a micro-lens 218. The LED chip 214 is produced by fabricating a negative electrode 220 as the common electrode on the carrier 222, as shown in FIG. 23. The LED chip 214 consists of an $SiO_2$ layer 224, n-$Al_yGa_{1-y}As$ layer 226, $Al_xGa1-x_{1-x}As$ activated layer 228, p-$Al_yGa_{1-y}As$ layer 230, and a ring-shaped positive electrode 232. A driving conductor is drawn out of the ring-shaped positive electrode 232. In this LED chip, the rapid-response AlGaAs LED activated layer 228 is driven by the ring-shaped positive electrode 232.

The light generated by the LED cell is focused by the micro-lens 218 of the micro-lens array 216 disposed adjacent to the LED array 214. Crosstalk is minimized because the surface between the lenses is shielded by a light shielding film 236. The light-receiving sensor of the optical-input sensor cell receives an intensified energy because the light dispersed spherically by the activated layer 228 is focused by the lens 218.

In the processing chip shown in FIG. 6, the area occupied by an optical-input cell array is smaller than the entire chip area. Consequently, the area occupied by an LED on an LED array covering the entire surface of the processing chip is also small. Thus, the driving electrode of each LED can be provided not only around peripheral parts of the LED chip but also inside the LED chip using through holes.

Another LED-array construction is shown in FIG. 24. Micro-lens arrays 416 are disposed closely on the LED chip 400. FIG. 24 shows the cross-section of the peripheral part of the LED array. The LED chip 400 having a positive electrode 404 for optical-input control on a GaAs substrate 402 consists of an $SiO_2$ layer 406, a p-$Al_yGa_{1-y}As$ layer 408, an $Al_xGa_{1-x}As$ activated layer 410, n-$Al_yGa_{1-y}As$ layer 412, and a ring-shaped common negative electrode 414. The ring-shaped common negative electrode 414 is disposed on the upper surface of the light-emitting layer, and micro-lens arrays 416 are disposed closely on the side of the negative electrode. The control electrode 404 is led through a through hole 418 to a bonding pad 422 provided on the rear surface of the GaAs substrate 402.

The LED chip 400 is of a flip-bonding type in which the bonding of the wiring board or the carrier 424 and the LED chip 400 is effected in high density by means of the solder bump 426 via the printed lead wire 428 on the carrier 424.

In this type of chip, a through hole can be provided at a portion where there is no LED active part of the LED chip to lead the control electrode because the LED elements are provided on a small portion of the LED chip 400.

In the case where the LED chip is not connected directly to the carrier, the substrate 402 must be of a sufficient size to allow for sufficient inner bonding pitches. The common electrode is connected via the large-scale pads on the four corner of the substrate, while the control electrode is connected via the bonding pads provided around the substrate.

FIG. 25 shows another optical interconnection block that is different from the optical interconnection between an LED array and an optical-input cell on a processing cell, as shown in FIGS. 23 and 24. With this optical interconnection block, two micro-lens arrays 434 and 436 are disposed between an LED array 430 and an optical-input cell array 432. The LED element 440 of the LED array 430 is positioned at the focal position of the micro-lens 438 of the micro-lens array 434, while the light-receiving sensor 442 of the optical-input cell array 432 is positioned at the focal position of the micro-lens 444 of the micro-lens array 436. Then, the micro-lens 438 of the micro-lens array 434 is disposed facing the micro-lens 444 of the micro-lens array 436. Light-shielding films 446 and 448 are provided between the micro-lenses of the micro-lens array 434, and between micro-lenses of the micro-lens array 436 to eliminating crosstalk. With the above-mentioned construction of optical interconnection block, the light emitted from the LED element 440 propagates between the micro-lenses 434 and 436 in the form of a parallel beam and focuses on the light-receiving sensor 442. This method allows optical signals from an LED array to be entered efficiently to a sensor array on a processing chip.

Figure 26:
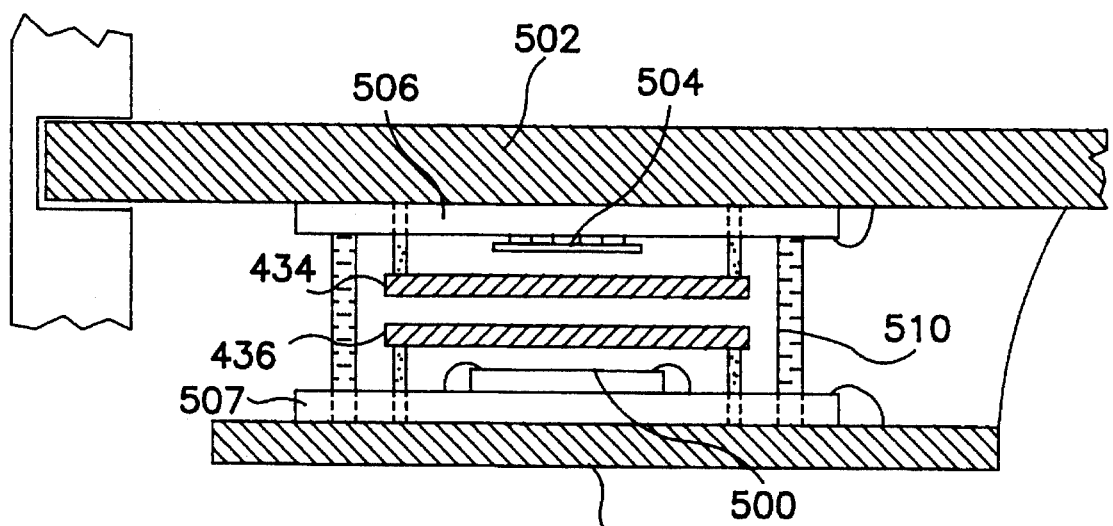
FIG. 26 is a diagram illustrating the construction of an optical interconnection block.

FIG. 26 shows a further detailed example in which the optical interconnection block of FIG. 25 is employed. In FIG. 26, a carrier board 506 having an LED array 504 is mounted on a rigid circuit board 502. A processing chip 500 is mounted on a flexible circuit board 508 on the lower part via a chip carrier board 507, and fixedly fitted to a rigid circuit board 502 on the upper part with a positioning and fixing supports 510. The micro-lens arrays 434 and 436, which have been described with reference to FIG. 25, are disposed facing each other between the LED array chip 504 and the processing chip 500 on the carriers 506 and 507. Optical signals from the LED element of the LED array 504 are transmitted efficiently to the light-receiving sensor of the optical-input cell on the processing chip 500.

Although the above optical interconnection block is suitable for a construction involving relatively few input bits, it is not suitable for handling a large number of optical inputs, as in the case of Example 2 in Table 1 having a full-ALU processor array construction, because of the difficulty in manufacturing LED chips with the present level of technology having a limited number of input pins.

Figure 27:
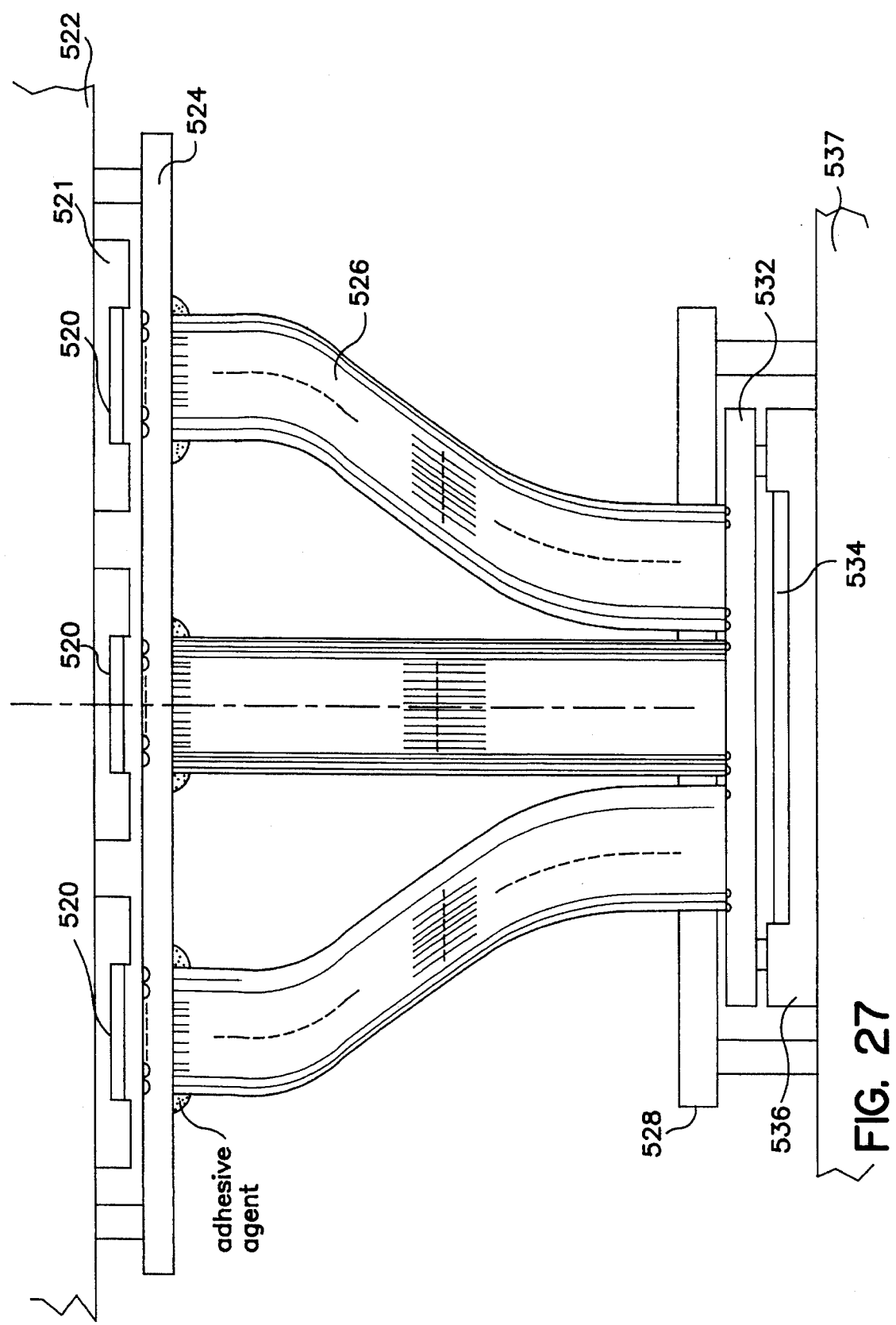
FIG. 27 is a diagram illustrating an optical interconnection block using fiber bundles.

FIGS. 27–29 show a system in which a plurality of flexible fiber bundles are used to avoid the above-mentioned problems. In FIG. 27, an LED array is divided into LED chips 520 having a readily manufacturable number of LED elements, packaged in LED chip packages 521, and mounted on a rigid circuit board 522. There is no limit in the space for the layout of LED chips because of the use of fiber bundles, which will be described later. Micro-lens arrays 524 having micro-lenses at positions facing the LED chips are disposed adjacent to the LED array.

A fiber bundle 526 one end of which is disposed at the focusing position of the micro-lens array is provided corresponding to each LED chip, with the other end of the fiber bundle 526 is passed through a fiber guide 528 and fixed to the glass surface of the micro-lens array 532. A processing chip 534 having an optical-input cell array at the focusing position of the micro-lens array 532 is provided. The processing chip 534 is packaged in a chip package 536.

Figure 28A:
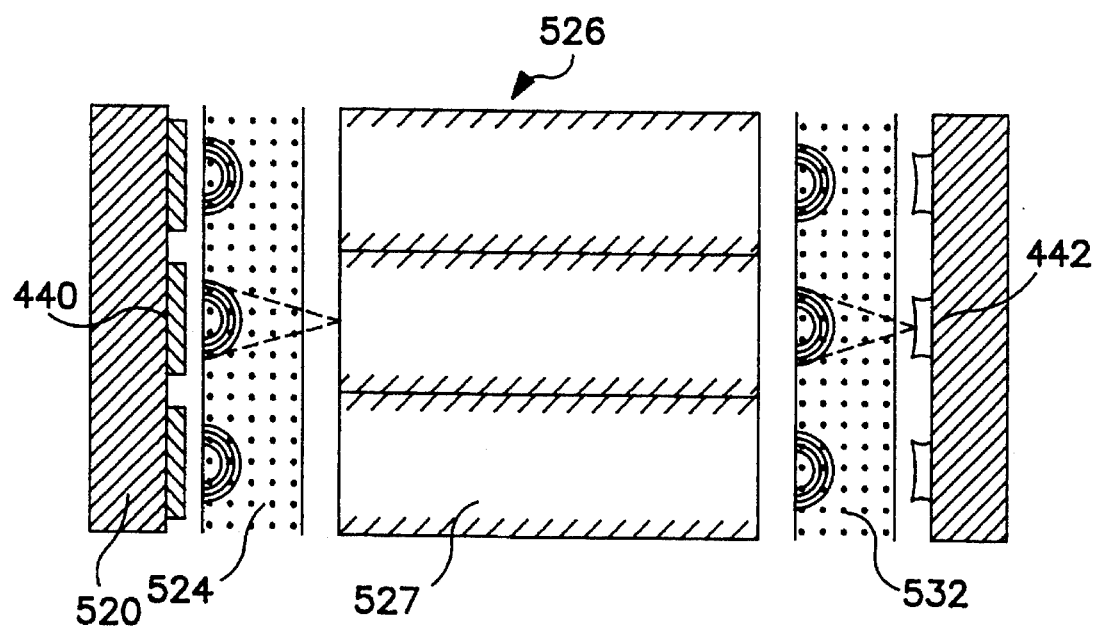
FIGS. 28A and 28B are diagrams illustrating the difference in optical interconnection between two types of fiber bundles.
Figure 28B:
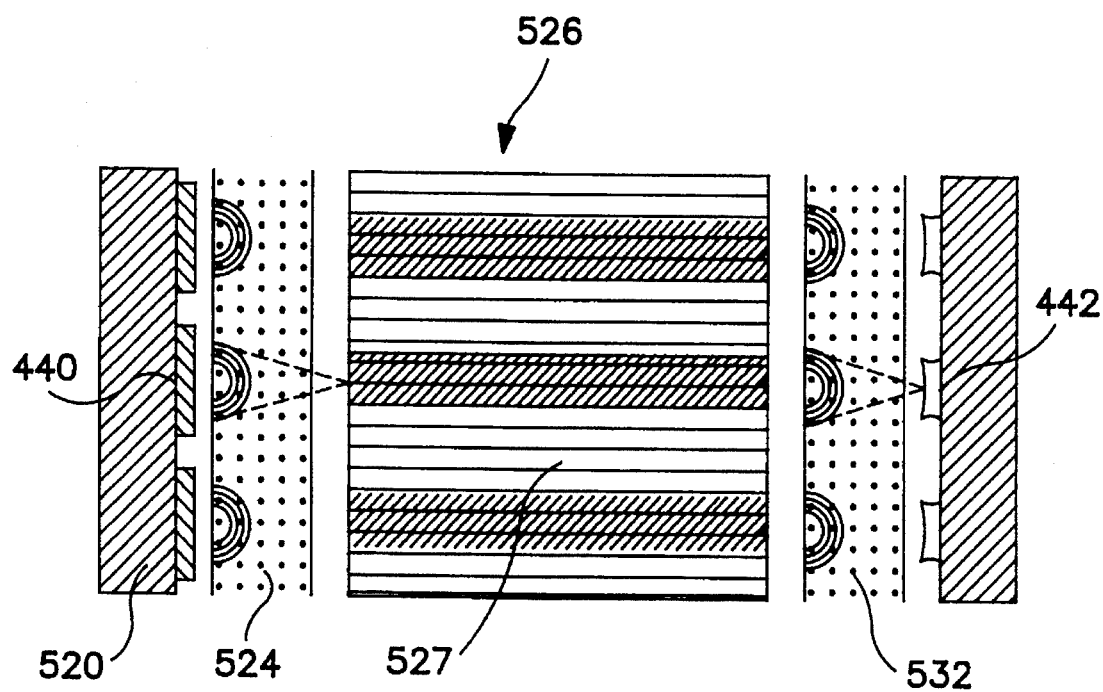

The light emitted from the LED element is led to the fiber bundle 526 by the micro-lens array 524. There are two types of the construction of the fiber bundle 526, as shown in FIGS. 28A and 28B; one is the type shown in FIG. 28A in which one fiber 527 of the bundle 526 corresponds with each element 440 of the LED, and the other is the type shown in FIG. 28B in which a large number of fibers 527 correspond to each element 440. The type shown in FIG. 28B is commonly used in ordinary image bundles. Needless to say, a construction having a light-shielding means is required for optical input and output to eliminate crosstalk. In FIG. 28A, too, adjustment in the mounting positions of the LED array and the optical-input cell array is easy so long as precise diameter of fiber forming bundles are manufactured, though care has to be taken in designing the arrangement of the equal-pitch fiber diameter, and the bundling of fibers.

As for sensor arrays on the processing chip 534 in FIG. 27, an optical interconnection method with a single bundle is relatively easy, in which optical-input cell arrays of the four processor cells are shifted to neighboring positions as shown by dotted lines in FIG. 6, and handling these four processor as a unit group by a single LED array. In Example 2 of Table 1, optical input for 256 LED elements is performed by a single fiber bundle. As described above, the size of an optical-input cell element including a light-receiving sensor is 100-μm square, and the diameter of a fiber bundle which handles optical input to the optical-input cell elements of the four processing cells is 2.3 mm. A bundle diameter of 3 mm is sufficient when the peripheral part is excluded. In the bundle shown in FIG. 28A, the micro-lens array 520 on the input side can be omitted so long as a multi-component graded fiber is used. In the case of FIG. 28B, on the other hand, an optical input device can be easily constructed on the input side if the LED array 520 and the micro-lens array 524 are fixed at precise positions. On the output side, the central part of bundles having a precise fiber arrangement in the bundle must be used to make sure that the output image of the LED array maintain precise pitches. As shown in FIG. 27, bundles must be deformed to an appropriate degree. This makes it impossible to protect fiber bundles with a rigid material. Fibers must be protected with flexible plastics or other similar materials. Considering that the diameter of fibers used in the example of FIG. 28B is less than 20 μm, preferably about 10 μm, utmost care is needed in handling the fibers.

FIG. 27 shows the case where micro-lenses are used for optical input and output. On the output side, light from a plurality of LED chips 520 mounted on a board 522 is concentrated by one piece of micro-lens array 524. However, fitting a lens array to each LED chip makes positioning easier. Every fiber bundles 526 are secured accurately to the glass surface of every image-forming micro-lenses.

In direct optical input through fiber bundles 526 to a processing chip 534, the size of an LED element of the LED chip 520 cannot exceed the size of a light-receiving sensor of the optical-input cell on the processing cell, but it is easy to fabricate both the LED element and the light-receiving sensor precisely to the same dimensions using semiconductor fabricating technology, and it is also relatively easy to maintain the accuracy of fiber bundles. Consequently, an optical input system can be realized by positioning either of the LED array or the optical-input cell array. In this system, optical-input cells should preferably be formed into an array shape as shown by dotted lines in FIG. 6. First, the upper micro-lens array 524 and the fiber bundle 526 are positioned. Next, the micro-lens array 524 to which the fiber bundle 526 is fixed and the LED array are positioned and secured in position. Then, the micro-lens array 532 and the processing chip 534 are independently positioned, and the fiber bundle 526 is fixedly fitted to the micro-lens 532. The last operation requires utmost attention.

FIG. 29 shows an optical interconnection block similar to that shown in FIG. 27, except for optical-input method to the processing chip. Like component elements are indicated by like reference numerals in FIG. 27. In this optical interconnection block, one or a plurality of sensor array chips 540, second LED chips 542 and micro-lens arrays 544 are provided between the processing chip (not shown) and the micro-lens array 532. The micro-lens array 532 is mounted on a chip carrier 546, the second LED chip 542 is mounted on a chip carrier 548, and these chip carriers 546 and 548 are fixedly fitted to a rigid board 550.

In the optical interconnection block shown in FIG. 29, the light passed through fiber bundles is temporarily received by one or a plurality of sensor array chips 540, which are electrically connected to the second LED array 542 mounted on the opposite surface of the sensor array on the rigid board via the periphery of the chip or through the through hole. The optical interconnection construction between the LED array 542 and the processor chip is similar to that shown in FIG. 25. Since output from fibers do not enter directly into the light-receiving sensor of the processor chip in FIG. 29, the size of the sensor element of the sensor array chip 540 located in between is not limited, and optical coupling can be easily led through the fiber bundles to the sensor elements. If the size of the elements of the first LED arrays 520 on the controller side is 300-μm square, the size of the sensor elements is also 300-μm square. Using 100-μm bundles, the same effects as with FIG. 28B can be achieved. The driver of the second LED array 542 is disposed in the peripheral region 552 of the sensor array. The driver can be manufactured integrally with the sensor array chip, or as a separate chip. FIG. 29 shows an integral type in which LED driving current is led to the second LED array element which corresponds directly to the output of the sensor array via the driver as the driving wiring 554 is passed through a multi-layer board consisting of chip carriers 546 and 548 and a rigid board 550. In a type having a separate driver chip, the driver may be mounted on the side of the LED. As described above with reference to FIG. 23, when the LED array 542 is optically coupled directly with the processing cell array, LED elements are provided on only a small area of the LED array chip, that is, on part of the area corresponding to the processing section other than the optical input section. Consequently, the LED element driving wiring 554 can be led through the LED chip surface, using this space. This state is schematically shown in the second LED chip 542 in FIG. 29. Positioning this optical interconnection section is easy so long as the LED element of the first LED chip group 520 on the controller side in FIG. 29 is provided over a large area. It is sufficient to fix the rigid board 550 on which the sensor array chip 540 and the second LED chip 542 are mounted to the upper board (for mounting the first LED chip group) 522. In the case of FIG. 27, the board 522 for mounting the LED array may be different from the board 537 for mounting the processing chip 534.

The invention claimed is:

1. A parallel computer system for executing data processing in parallel and in a pipeline processing mode, said parallel computer system comprising:

a control section including a plurality of controllers;

a processing section including a plurality of processors, each one of the plurality of processors being associated with a respectively different one of the plurality of controllers;

an optical interconnection section for optically coupling each one of said plurality of controllers to the one of said plurality of processors with which it is associated, wherein said optical interconnection section transmits a plurality of optical signals from said one controller to said one processor, said optical signals comprising at least one of a plurality of optical data signals and a plurality of optical control signals;

a first electrical interconnection section, independent of said optical interconnection section, for coupling each one of said plurality of controllers to at least one of said plurality of processors, wherein said first electrical interconnection section transmits electrical control signals from said control section to said processing section;

a second electrical interconnection section, independent of said optical interconnection section and said first electrical interconnection section, coupled to said plurality of processors, for conveying data among said plurality of processors to the substantial exclusion of any control signals, wherein said second electrical interconnection section includes a plurality of inter-processor data transfer buses which interconnect said plurality of processors, wherein said plurality of inter-processor data transfer buses are controlled by a plurality of control signals provided by said control section.

2. A parallel computer system which performs multi-instruction and multi-data flow processing in a pipeline processing mode, said parallel computer system comprising:

a control section including a plurality of controllers and at least one memory;

a processing section including a plurality of processors each of the plurality of processors coupled to a respectively different one of said plurality of controllers;

an optical interconnection section for optically coupling each of said plurality of controllers to the respective one of said plurality of processors; and an electrical interconnection section, independent of said optical interconnection section, for coupling said control section to said processing section, wherein:

a plurality of inter-processor data transfer buses which interconnect said plurality of processors to convey data signals substantially exclusive of any control signals among said plurality of processors, wherein said plurality of inter-processor data transfer buses are controlled by a plurality of control signals provided by said control section;

said optical interconnection section transmits a plurality of optical signals from each of said plurality of controllers to the respective one of said plurality of processors, wherein said optical signals include at least one of a plurality of optical data signals and a plurality of optical control signals;

said electrical interconnection section transmits electrical signals, including a plurality of control signals, from said control section to said processing section; and said electrical interconnection section transmits electrical signals, including a plurality of data signals, from said processing section to said control section.

3. A parallel computer system as set forth in claim 2 wherein the plurality of controllers is located on at least one controller chip and the plurality of processors is located on at least one processor chip said at least one controller chip being different from said at least one processor chip.

4. A parallel computer system as set forth in claim 2 comprising a plurality of computer units defined by said plurality of controllers and said plurality of processors, wherein pipeline processing is executed in each of said computer units by transmitting a plurality of data signals and a plurality of instruction-control signals through said optical interconnection section from at least one of said plurality of controllers to at least one of said plurality of processors, and transmitting a plurality of data output control signals from said controllers to said processors.

5. A parallel computer system as set forth in claim 2 including a plurality of computer units in which said plurality of controllers and said plurality of processors are interconnected, and pipeline processing is executed in each of said computer units by transmitting at least one of said plurality of data signals and at least one of said plurality of instruction-control signals through the optical interconnection section from the control section to the processor section, and transmitting at least one of said plurality of interconnection-control signals and at least one of said plurality of data signals through said electrical connection section from said control section to said processor section.

6. A parallel computer system as set forth in claim 2, said parallel computer system further including a plurality of computer units, each formed by one of said plurality of controllers interconnected with the respective one of said plurality of processors, wherein pipeline processing is executed in each of said computer units by transmitting different data from each of said plurality of controllers to the respective one of said plurality of processors through said optical interconnection section, and by transmitting a plurality of instruction-control signals from said plurality of controllers to said plurality of processors.

7. A parallel computer system as set forth in claim 3 wherein said plurality of inter-processor data transfer buses are wired to connect every processor on said processor chip with the adjacent processors in the left and right, and in the up and down directions; in which one of said transfer buses is used to read data and another one of said transfer buses is used to write data, said transfer buses including circuits in the peripheral part of said processor, wherein read and write operations in said processor are executed by a tri-state switch located between said processors and gated by control logic circuitry in said processors which are operated by a plurality of optical control signals transmitted from said control section to said processing section.

8. A parallel computer system as set forth in claim 7 wherein said read and write inter-processor buses can directly connect any two of said processors located in one row or in one column of said chip by use of bypass switches in the peripheral part of each of said processors, said bypass switches being controlled by said control logic circuit operated by a plurality of optical control signals transmitted from said control section to said processor section.

9. A parallel computer system as set forth in claim 8 wherein additional control buses between said processors on said processor chip are used to request a processor to perform data transfer between other than its nearest processors and to return acknowledge signals from said requested processor, to make master-slave relations among said processors by turning on said bypass switches in the intermediate processors, located between said master processor and said slave processor, and to transfer signals to operate the tri-state switches of said inter-processor data transfer buses from said master processors to said slave processors and to said intermediate processors, wherein control signals making said master-slave relations among said processors on said processor chip are transferred to said control logic circuits in said processors in response to optical control signals provided by said control section to said processing section.

10. A parallel computer system having a control section including a plurality of controllers, a processing section including a plurality of processors each of said plurality of processors being interconnected to a respectively different one of said plurality of controllers, an optical interconnection conveying a plurality of optical signals, including at least one of a plurality of optical data signals and a plurality of optical control signals, between each of said plurality of controllers and the respective one of said plurality of processors, a first electrical interconnection means, independent of said optical interconnection, for interconnecting said control section and said processing section, and a second electrical connection means, independent of said optical interconnection and said first electrical interconnection means, distinct from the first electrical connection means for conveying data among said plurality of processors wherein each of the processors is operating an individual program, and wherein the coordination of the operation of the programs by said plurality of processors is executed by receiving as flag signals a state of program execution transmitted from one of said plurality of processors to said control section.

11. A system control block as set forth in claim 10 wherein said flag signals are transmitted when one of said plurality of processors enter into relations in terms of program execution with others of said plurality of processors, and interrupt the execution of said programs being operated by said plurality of processors.

12. A system control block as set forth in claim 10 wherein said flag signals are reset to cause all of said processors to restart when all of said processors generate said flag signals and stop operating.

13. A system control block as set forth in claim 10 wherein system control function of said flag signal creation is distributed to said plurality of controllers in said control section.

* * * * *